US011483718B2

(12) United States Patent
Suzuki

(10) Patent No.: US 11,483,718 B2
(45) Date of Patent: Oct. 25, 2022

(54) COMMUNICATION SYSTEM

(71) Applicant: Mitsubishi Electric Corporation, Chiyoda-ku (JP)

(72) Inventor: Kuniyuki Suzuki, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 16/992,217

(22) Filed: Aug. 13, 2020

(65) Prior Publication Data

US 2020/0374708 A1 Nov. 26, 2020

Related U.S. Application Data

(62) Division of application No. 16/484,899, filed as application No. PCT/JP2018/007132 on Feb. 27, 2018, now Pat. No. 10,785,661.

(30) Foreign Application Priority Data

Mar. 21, 2017 (JP) .................................. 2017-053919

(51) Int. Cl.
*H04W 16/28* (2009.01)
*H04B 7/06* (2006.01)
*H04B 7/024* (2017.01)

(52) U.S. Cl.
CPC ............ *H04W 16/28* (2013.01); *H04B 7/024* (2013.01); *H04B 7/0617* (2013.01); *H04B 7/0626* (2013.01); *H04B 7/0628* (2013.01)

(58) Field of Classification Search
CPC ......... H04W 16/28; H04B 4/02; H04B 4/024; H04B 4/04; H04B 4/0404; H04B 4/0408;
(Continued)

(56) References Cited

U.S. PATENT DOCUMENTS 8,081,702 B2  12/2011  Hoshino et al.
8,462,869 B2   6/2013  Okino
(Continued)

FOREIGN PATENT DOCUMENTS

JP  2009-542043 A  11/2009
JP     4481336 B2   3/2010
(Continued)

OTHER PUBLICATIONS

The partial Supplementary European Search Report dated Oct. 30, 2020 in European Patent Application 18770534.8, 14 pages.
(Continued)

*Primary Examiner* — Siu M Lee
(74) *Attorney, Agent, or Firm* — Oblon, McClelland, Maier & Neustadt, L.L.P.

(57) ABSTRACT

Provided is a technology capable of securing satisfactory communication quality. A communication system includes a user equipment, and a base station configured to be connected to the user equipment to perform radio communication with the user equipment. The user equipment performs radio communication with a beam. When the user equipment detects a beam disappearance state being a state incapable of maintaining communication quality with the base station, the user equipment transmits a notification of the beam disappearance state with a beam having a wider half width than a half width before detection of the beam disappearance state.

3 Claims, 17 Drawing Sheets

(58) Field of Classification Search
CPC .. H04B 4/0413; H04B 4/0608; H04B 4/0613; H04B 4/0617; H04B 4/0626; H04B 4/0628; H04B 4/0695; H04B 4/088

See application file for complete search history.

(56) References Cited

U.S. PATENT DOCUMENTS

| | | | |
|---|---|---|---|
| 2006/0094373 A1* | 5/2006 | Hottinen | H04B 7/066 455/562.1 |
| 2007/0270151 A1 | 11/2007 | Claussen et al. | |
| 2009/0185634 A1 | 7/2009 | Hoshino et al. | |
| 2010/0220597 A1* | 9/2010 | Ji | H04W 16/10 370/336 |
| 2011/0105064 A1 | 5/2011 | Kusano et al. | |
| 2013/0005388 A1 | 1/2013 | Naka et al. | |
| 2013/0072247 A1 | 3/2013 | Park | |
| 2016/0099763 A1* | 4/2016 | Chen | H04B 7/063 370/329 |
| 2017/0104517 A1* | 4/2017 | Kakishima | H04B 7/0697 |
| 2017/0359806 A1 | 12/2017 | Takeda et al. | |
| 2018/0006696 A1* | 1/2018 | Yue | H04B 7/063 |
| 2018/0006702 A1* | 1/2018 | Doostnejad | H04B 7/088 |
| 2018/0091212 A1* | 3/2018 | Lee | H04B 7/086 |
| 2018/0123667 A1 | 5/2018 | Taira et al. | |
| 2018/0219604 A1 | 8/2018 | Lu | |
| 2019/0020435 A1 | 1/2019 | Nishimoto et al. | |
| 2019/0254082 A1 | 8/2019 | Takeda | |
| 2019/0260459 A1* | 8/2019 | Jeon | H04B 7/0617 |
| 2020/0007219 A1* | 1/2020 | Fellhauer | H04B 7/0491 |
| 2020/0295817 A1* | 9/2020 | Loghin | H04B 7/0617 |

FOREIGN PATENT DOCUMENTS

| | | |
|---|---|---|
| JP | 4776565 B | 7/2011 |
| JP | 2015-185953 A | 10/2015 |
| WO | WO 2007/099998 A1 | 9/2007 |
| WO | WO 2007/139680 A2 | 12/2007 |
| WO | WO 2009/157513 A1 | 12/2009 |
| WO | WO 2011/118212 A1 | 9/2011 |
| WO | WO 2016/086144 A1 | 6/2016 |
| WO | WO 2016/121914 A1 | 8/2016 |
| WO | WO 2017/022108 A1 | 2/2017 |
| WO | WO 2017/145232 A1 | 8/2017 |

OTHER PUBLICATIONS

International Search Report dated May 22, 2018 in PCT/JP2018/007132 filed on Feb. 27, 2018.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.0.0 , [online], 2015, 254 pages.

"LS on HNB/HeNB Open Access Mode", 3GPP SA WG1, S1-083461, 2008, 2 pages.

3rd Generation Partnership Project; Technical Specification Group Radio Access Network; Evolved Universal Terrestrial Radio Access (E-UTRA); Further Advancements for E-UTRA physical layer aspects (Release 9), 3GPP TR 36.814 V9.0.0, [online], 2010, 104 pages.

3rd Generation Partnership Project; Technical Specification Group Radio Access Network; Feasibility Study for Further Advancements for E-UTRA (LTE-Advanced) (Release 10), 3GPP TR 36.912 V10.0.0 [online], 2011, 252 pages.

"Scenarios, requirements and KPIs for 5G mobile and wireless system", [online], ICT-317669-METIS/D1.1, Apr. 30, 2013, 83 pages.

"3rd Generation Partnership Project; Technical Specification Group Radio Access Network; Study on elevation beamforming/Full-Dimension (FD) Multiple Input Multiple Output (MIMO) for LTE", 3GPP TS 36.897 V13.0.0, [online], 2015, 200 pages.

Extended European Search Report dated Feb. 4, 2021 in corresponding European Patent Application No. 18770534.8, 11 pages.

Office Action dated Jan. 19, 2022 in Indian Application No. 201947034408 (English translated).

Office Action dated Apr. 12, 2022, in corresponding Japanese Patent Application No. 2019-507475 (with English Translation), 7 pages.

* cited by examiner

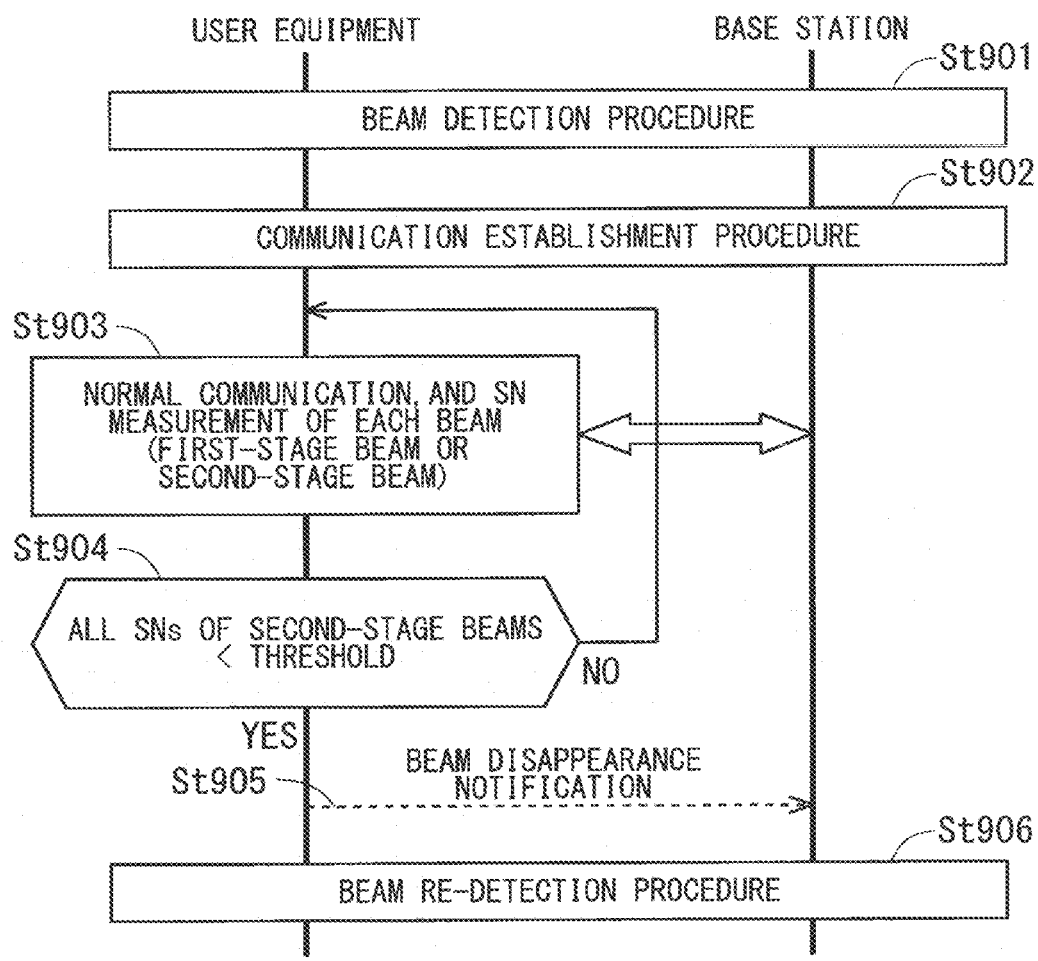
F I G. 9

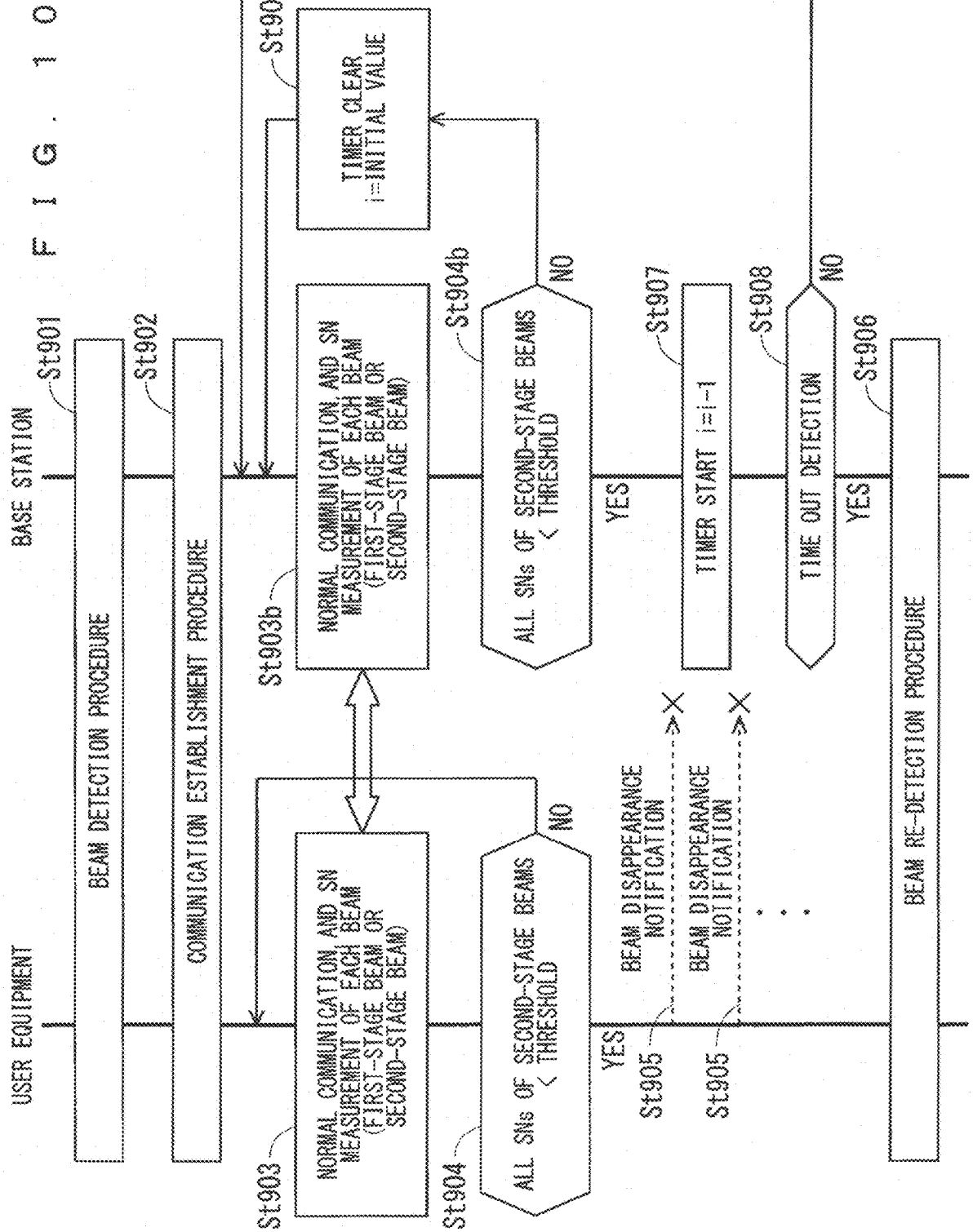

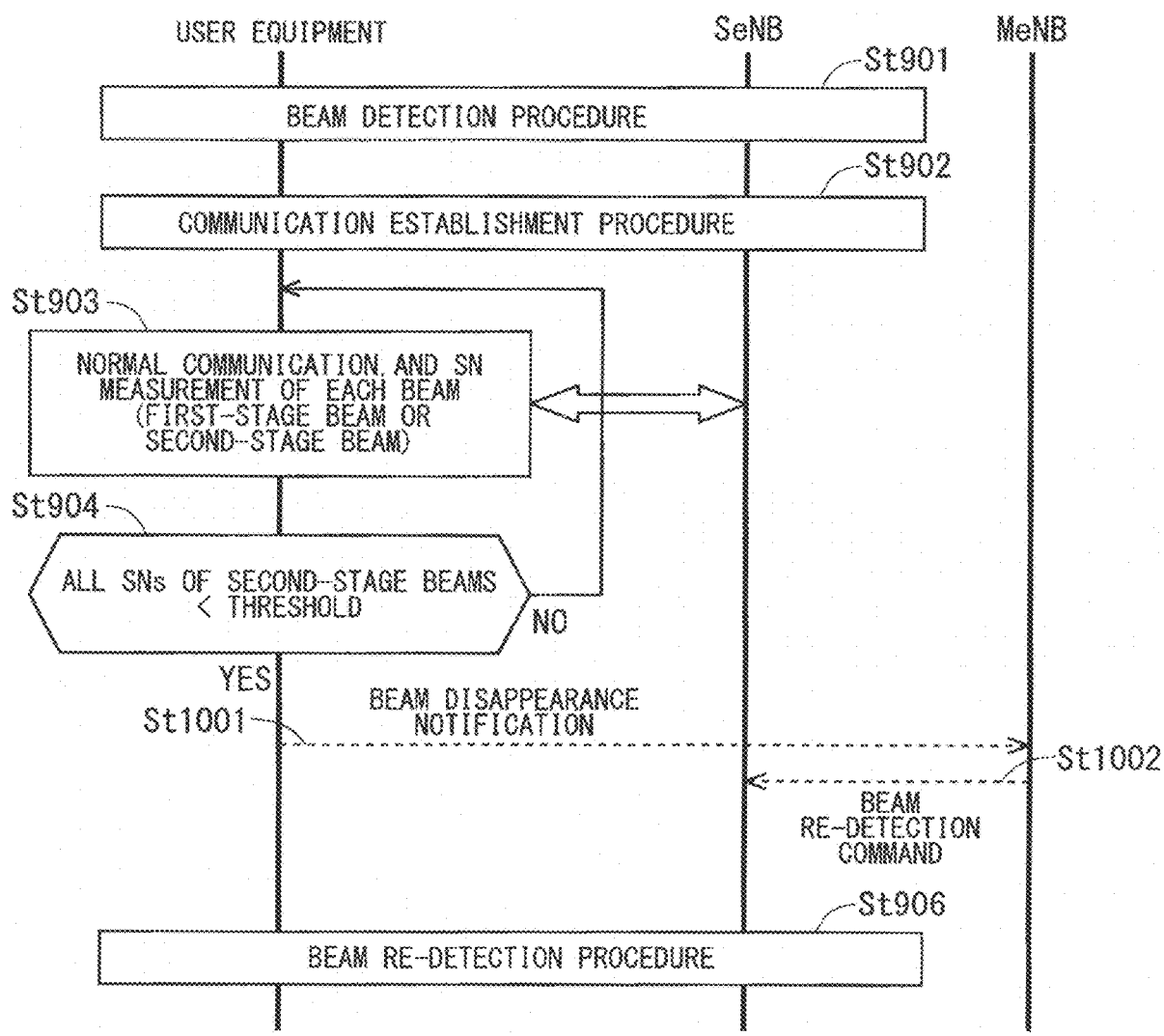
F I G . 1 1

F I G . 1 7
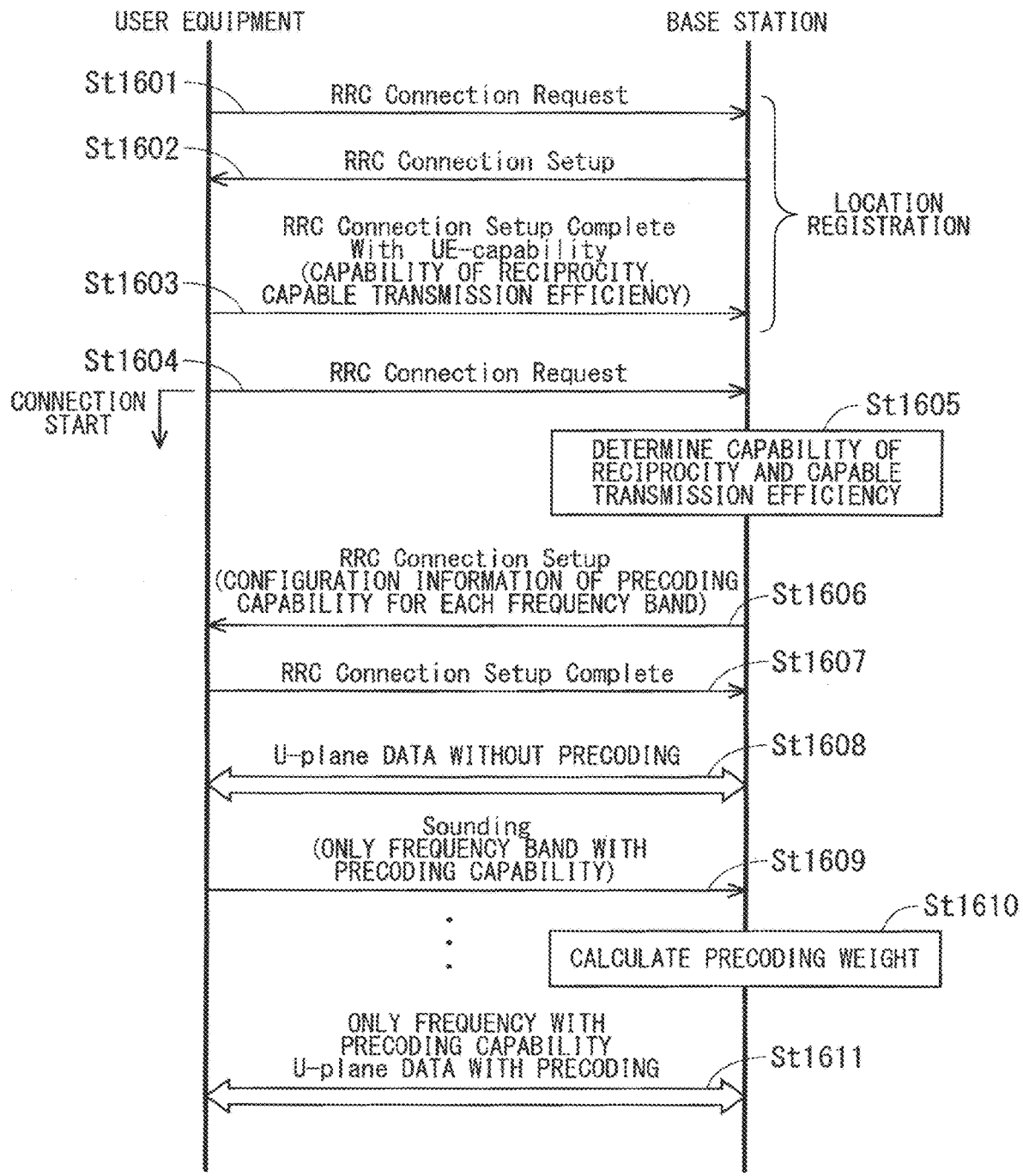

FIG. 18

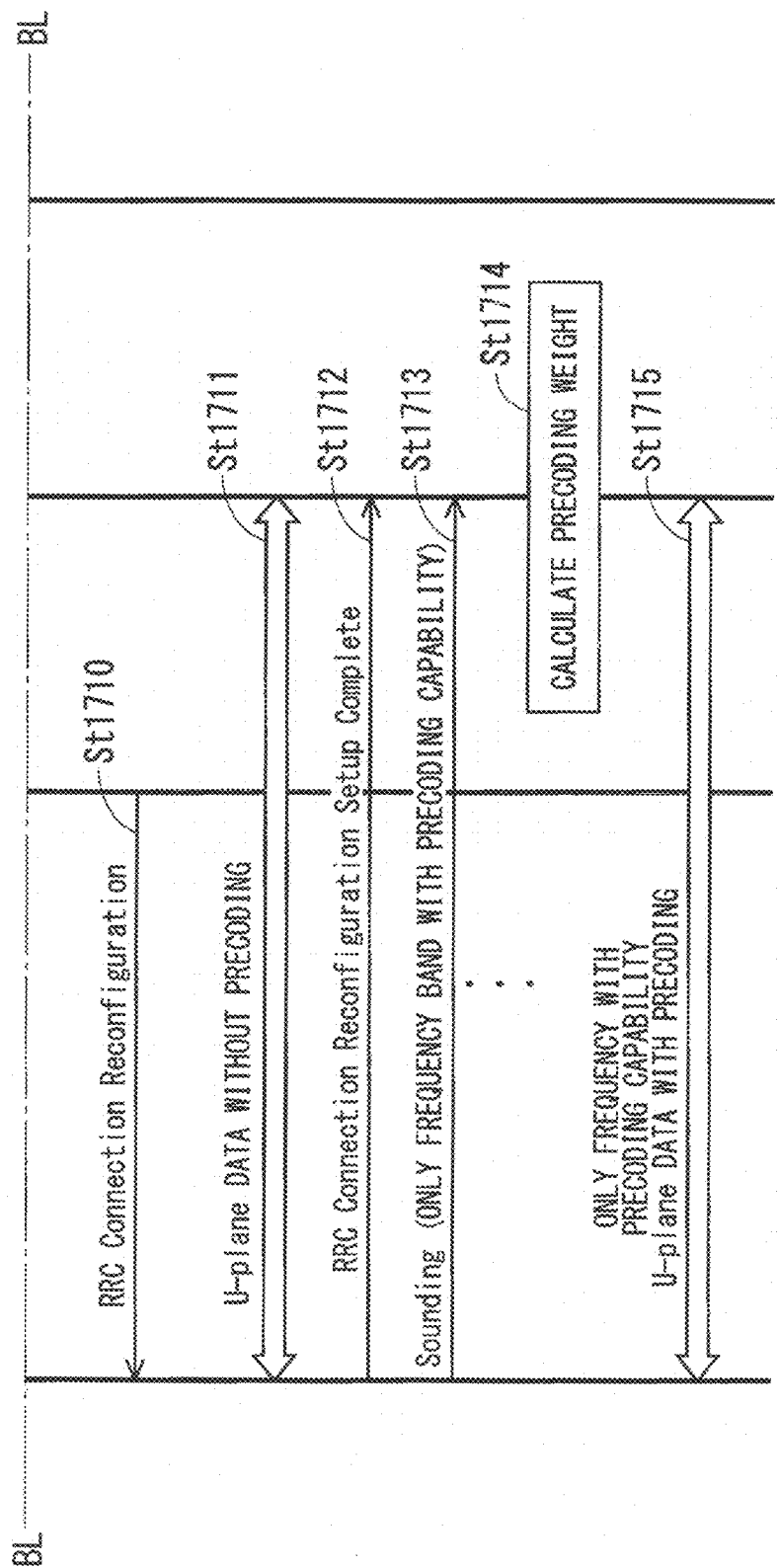

COMMUNICATION SYSTEM

CROSS-REFERENCE TO RELATED APPLICATIONS

This application is a division of and claims the benefit of priority under 35 U.S.C. § 120 from U.S. application Ser. No. 16/484,899 filed Aug. 9, 2019, the entire contents of which are incorporated herein by reference. U.S. application Ser. No. 16/484,899 is a National Stage of PCT/JP2018/007132 filed Feb. 27, 2018, which claims the benefit of priority under 35 U.S.C. § 119 from Japanese Application No. 2017-053919 filed Mar. 21, 2017.

TECHNICAL FIELD

The present invention relates to a communication system.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to a network as well (for example, see Non-Patent Documents 1 to 4). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a user equipment-specific reference signal (UE-specific reference signal), a positioning reference signal (PRS), and a channel state information reference signal (CSI-RS). The physical layer measurement objects of a communication terminal include reference signal received powers (RSRPs).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The closed subscriber group (CSG) cell is a cell in which subscribers who are allowed to use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by user equipments (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

In 3GPP, base stations referred to as Home-NodeB (Home-NB; HNB) and Home-eNodeB (Home-eNB; HeNB) are studied. HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, specifications of long term evolution advanced (LTE-A) are pursued as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a user equipment has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the user equipment capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one user equipment.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

The traffic flow of a mobile network is on the rise, and the communication rate is also increasing. It is expected that the communication rate is further increased when the operations of the LTE and the LTE-A are fully initiated.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a user equipment communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, increasing the transmission capacity of data using broadband frequencies, and increasing the transmission rate of data through increase in the spectral efficiency are being studied. To realize these, the techniques enabling the spatial multiplexing such as the Multiple Input Multiple Output (MIMO) and the beamforming using a multi-element antenna are being studied.

The MIMO is continuously studied also in LTE-A. From Release 13, full dimension (FD)-MIMO is studied as the extension of the MIMO, which uses two-dimensional antenna array. Non-Patent Document 6 describes the FD-MIMO.

It is studied that the 5G radio access system will be installed concurrently with the LTE system in the initial period of the launch of its service, which is scheduled in 2020. The following configuration is considered. Specifically, an LTE base station and a 5G base station are connected in a DC configuration, and the LTE base station is regarded as an MeNB and the 5G base station as an SeNB. C-plane data is processed in the LTE base station having a large cell range, and U-plane is processed in the LTE base station and the 5G base station.

PRIOR ART DOCUMENTS

Non-Patent Documents

Non-Patent Document 1: 3GPP TS 36.300 V13.0.0
Non-Patent Document 2: 3GPP S1-083461
Non-Patent Document 3: 3GPP TR 36.814 V9.0.0
Non-Patent Document 4: 3GPP TR 36.912 V10.0.0
Non-Patent Document 5: "Scenarios, requirements and KPIs for 5G mobile and wireless system", ICT-317669-METIS/D1.1
Non-Patent Document 6: 3GPP TR 36.897 V13.0.0

SUMMARY

Problem to be Solved by the Invention

The 5G system requires large-volume communication, and therefore also in the user equipment, forming beams with a super multi-element antenna having more than eight elements has been studied.

A method of forming beams with two stages in the base station to reduce a processing volume has been known. This is a method in which a plurality of basic beams having narrowed directivity are formed in a first stage, and SN enhancement or null formation is performed by using the first-stage beams in a second stage. The following two types of methods have been studied. One method is a hybrid method in which beams are formed in an analog manner in the first stage, and beams are formed digitally in the second stage. According to the hybrid method, processing of a digital unit can be reduced. The other method is a full-digital method in which beams are digitally formed also in the first stage by reducing the number of first-stage beams to the number that can be processed. According to the full-digital method, analog dispersion of frequency characteristics or the like can be reduced.

However, there has been no specific and clear instances as to formation and control of beams in the user equipment. Particularly, even when the user equipment performs time division duplex (TDD) communication with the base station, and the base station performs processing such as precoding by using reciprocity of uplink and downlink channels to transmit a signal, the base station cannot take interference in the user equipment into consideration, and thus optimal precoding cannot be performed. Therefore, there is a problem in that interference occurs in the user equipment due to a signal with another base station.

The present invention has an object to solve the above-mentioned problem and provide a technology capable of securing satisfactory communication quality.

For the sake of such an object, for example, the present invention provides a communication procedure necessary between a user equipment and a base station for specifically forming beams in the user equipment, and can thereby secure satisfactory communication quality.

Further, for example, the present invention provides a technology of forming first-stage basic beams of the user equipment with beams that do not interfere with another base station different from a base station to be communicated with, and can thereby secure satisfactory communication quality even when an opposing base station being a communication counterpart does not take interference of another base station into consideration.

Means to Solve the Problem

A first communication system of the present invention includes a user equipment, and a base station configured to be connected to the user equipment to perform radio communication with the user equipment. The user equipment performs radio communication with a beam. When the user equipment detects a beam disappearance state being a state incapable of maintaining communication quality with the base station, the user equipment transmits a notification of the beam disappearance state with a beam having a wider half width than a half width before detection of the beam disappearance state.

A second communication system of the present invention includes a user equipment, and a base station configured to be connected to the user equipment to perform radio communication with the user equipment. The user equipment performs radio communication with a beam. When the user equipment detects a beam disappearance state being a state incapable of maintaining communication quality with a first base station, the user equipment transmits a notification of the beam disappearance state to a second base station configuring dual connectivity with the first base station. When the second base station receives the notification of the beam disappearance state, the second base station gives a command to the first base station to perform beam re-detection processing with the user equipment.

A third communication system of the present invention includes a user equipment, and a base station configured to be connected to the user equipment to perform radio communication with the user equipment. The user equipment performs radio communication with a two-stage beamforming method by using a multi-element antenna. The user equipment transmits information for identifying an attribute of each first-stage beam to the base station.

A fourth communication system of the present invention includes a user equipment, and a base station configured to be connected to the user equipment to perform radio communication with the user equipment. When the user equipment communicates with a first base station while not communicating with a second base station, the user equipment measures a degree that the second base station interferes with a transmission signal from the first base station, and transmits a measurement result to the first base station. The first base station changes transmission power of a signal to be transmitted to the user equipment, based on a received measurement result.

A fifth communication system of the present invention includes a user equipment, and a base station configured to be connected to the user equipment to perform radio communication with the user equipment. When the user equipment communicates with a first base station while not communicating with a second base station, the first base station adjusts a communication condition for interference suppression between data transmission from the first base station to the user equipment and data transmission performed by the second base station, and requests the second base station to perform data transmission on the adjusted communication condition.

A sixth communication system of the present invention includes a user equipment, and a base station configured to be connected to the user equipment to perform radio communication with the user equipment. The user equipment performs radio communication with a two-stage beamforming method by using a multi-element antenna. When the user equipment communicates with a first base station while not communicating with a second base station, the user equipment forms, as first-stage beams, a first beam having a main beam directed to the first base station and a null directed to the second base station, and at least one second beam having a null directed to the second base station and having directivity different from directivity of the first beam.

A seventh communication system of the present invention includes a user equipment, and a base station configured to be connected to the user equipment to perform radio communication with the user equipment. The user equipment performs radio communication with a two-stage beamforming method by using a multi-element antenna. When the user equipment communicates with a first base station while not communicating with a second base station, the user equipment designs at least one beam having a main beam directed to a direction of a multipath of the first base station and having a null directed to the second base station by adjusting a configuration number of the multipath, and forms the designed beam as a first-stage beam.

An eighth communication system of the present invention includes a user equipment, and a base station configured to be connected to the user equipment to perform radio communication with the user equipment. The user equipment is configured to perform reciprocity-using channel estimation being channel estimation using reciprocity of a channel, for each frequency band. The user equipment transmits reciprocity capability information indicating whether or not the reciprocity-using channel estimation can be performed for each frequency band to the base station. The base station performs communication with the user equipment by using the reciprocity-using channel estimation in a frequency band in which both of the user equipment and the base station are allowed to perform the reciprocity-using channel estimation, based on the reciprocity capability information of the user equipment.

Effects of the Invention

According to the present invention, satisfactory communication quality can be secured.

These and other objects, features, aspects and advantages of the present invention will become more apparent from the following detailed description of the present invention when taken in conjunction with the accompanying drawings.

BRIEF DESCRIPTION OF DRAWINGS

FIG. 9 is a sequence diagram illustrating a first example of re-acquisition at the time of beam disappearance according to the first embodiment (in a case where the user equipment performs beam detection).

FIG. 10 is a sequence diagram illustrating a second example of re-acquisition at the time of beam disappearance according to the first embodiment (in a case where both of the user equipment and the base station perform beam detection).

FIG. 11 is a sequence diagram illustrating a third example of re-acquisition at the time of beam disappearance according to the first embodiment (in a case of dual-connectivity).

FIG. 17 is a sequence diagram illustrating an example in which configuration of capability of reciprocity for each frequency band is performed at the time of channel configuration according to a fourth embodiment.

FIG. 18 is a sequence diagram illustrating an example in which configuration of capability of reciprocity for each frequency band is performed at the time of handover according to the fourth embodiment.

FIG. 19 is the sequence diagram illustrating an example in which configuration of capability of reciprocity for each frequency band is performed at the time of handover according to the fourth embodiment.

DESCRIPTION OF EMBODIMENTS

First Embodiment

Figure 1:
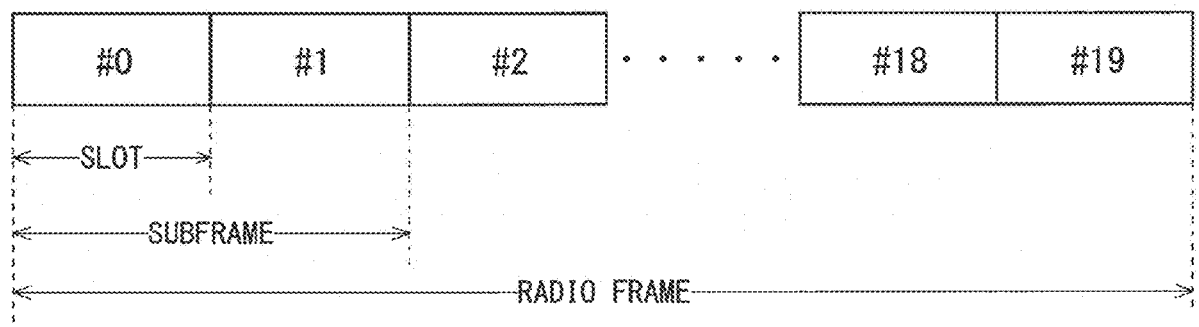
FIG. 1 is a diagram illustrating the configuration of a radio frame for use in an LTE communication system.
Figure 2:
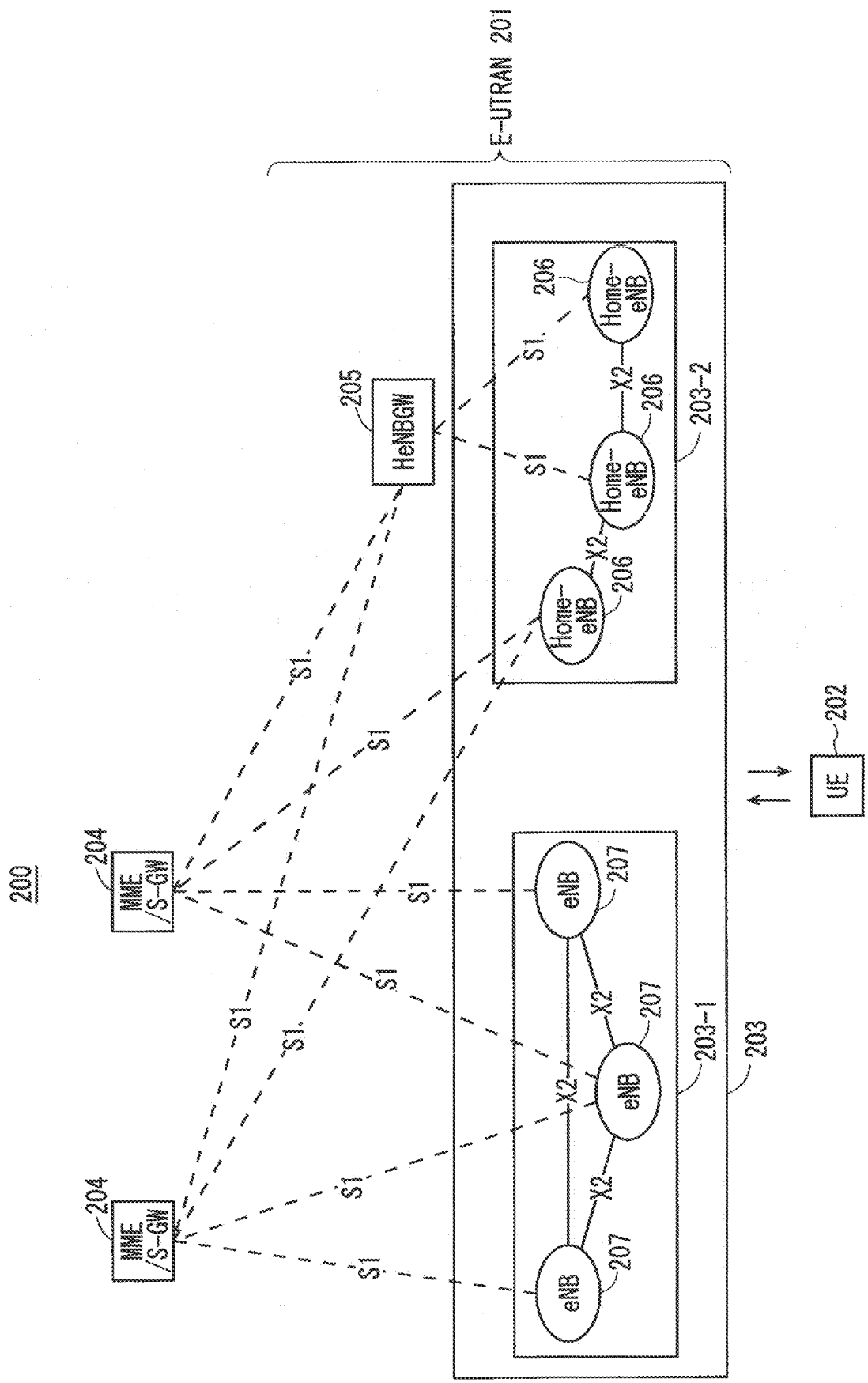
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, the configuration below is studied in 3GPP. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station 203 may configure a single cell or a plurality of cells. Each cell has a range predetermined as a coverage in which the cell can communicate with the user equipment 202 and have radio communication with the user equipment 202 within the coverage. In a case where one base station 203 configures a plurality of cells, every cell is configured so as to communicate with the user equipment 202.

Figure 3:
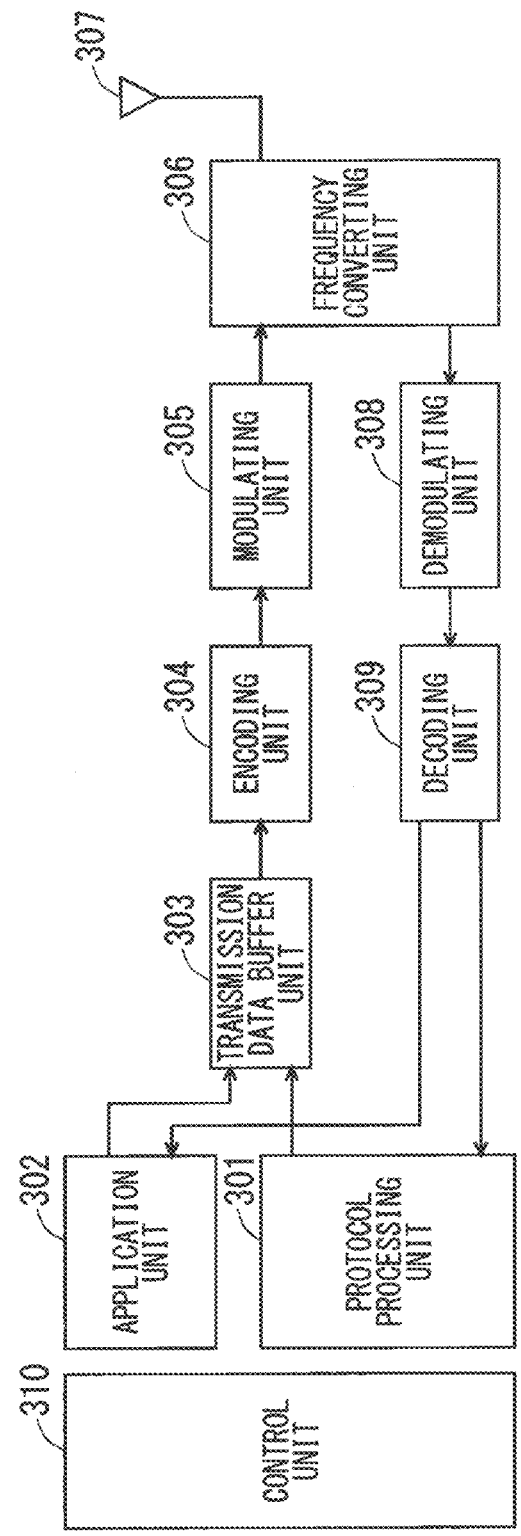
FIG. 3 is a block diagram showing the configuration of a user equipment 202 shown in FIG. 2 which is a communication terminal according to the present invention.

FIG. 3 is a block diagram showing the configuration of the user equipment 202 of FIG. 2 that is a communication terminal according to the present invention. The transmission process of the user equipment 202 shown in FIG. 3 is described. First, a transmission data buffer unit 303 stores the control data from a protocol processing unit 301 and the user data from an application unit 302. The data stored in the transmission data buffer unit 303 is passed to an encoding unit 304, and is subject to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309, and is subject to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
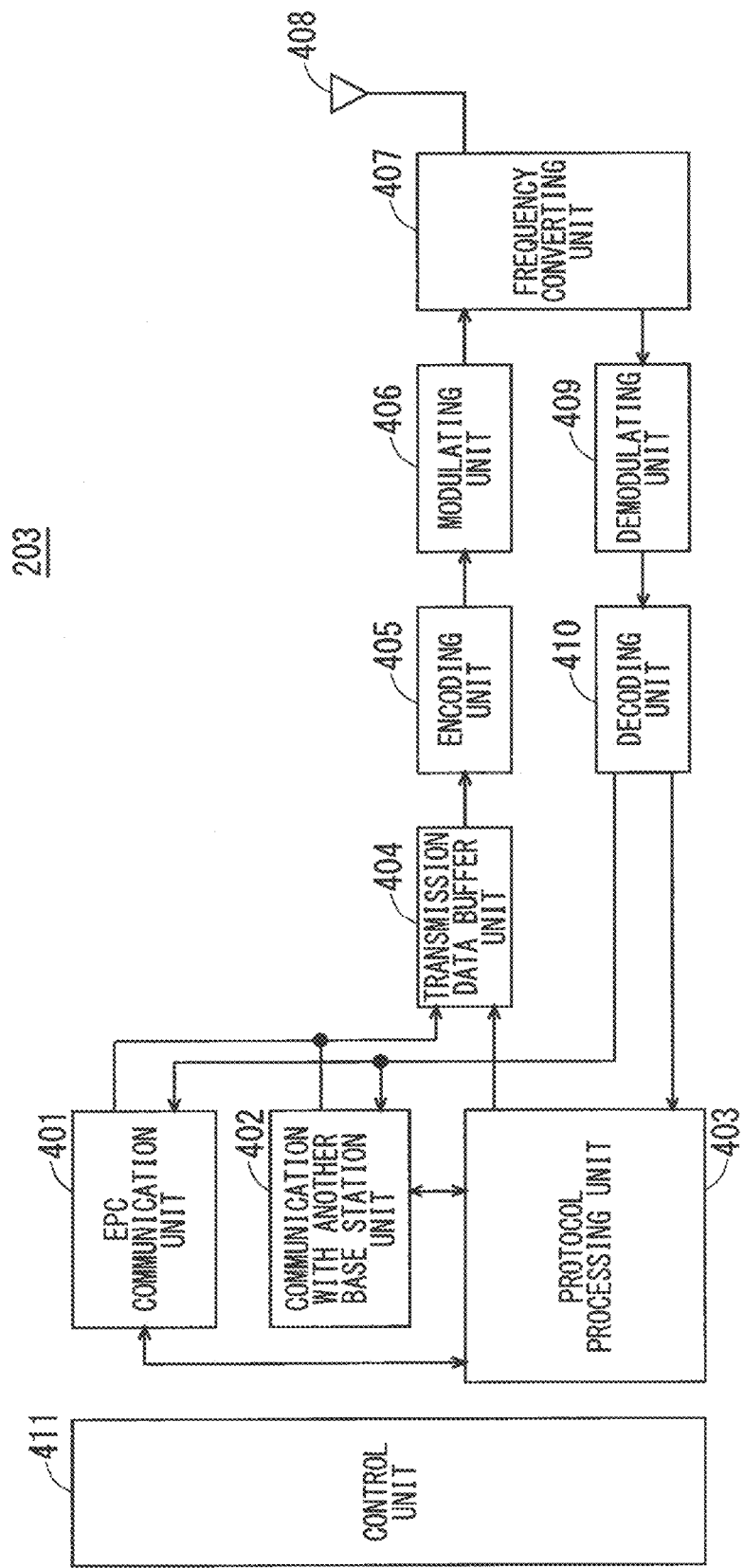
FIG. 4 is a block diagram showing the configuration of a base station 203 shown in FIG. 2 which is a base station according to the present invention.

FIG. 4 is a block diagram showing the configuration of the base station 203 of FIG. 2 that is a base station according to the present invention. The transmission process of the base station 203 shown in FIG. 4 is described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

Figure 5:
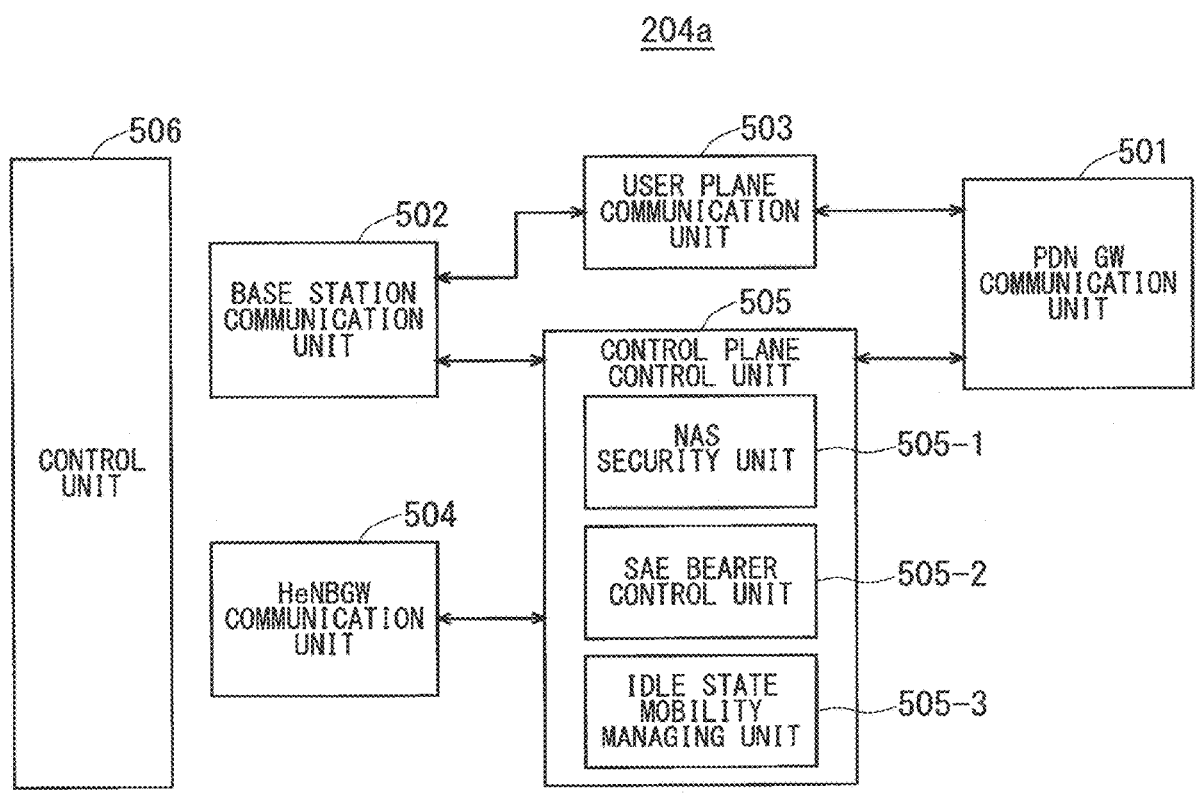
FIG. 5 is a block diagram showing the configuration of an MME according to the present invention.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MEME 204a and the PDN GW. A base station communication unit 502 performs data transmission and reception between the MME 204a and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

A HeNBGW communication unit 504 is provided in a case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

Figure 6:
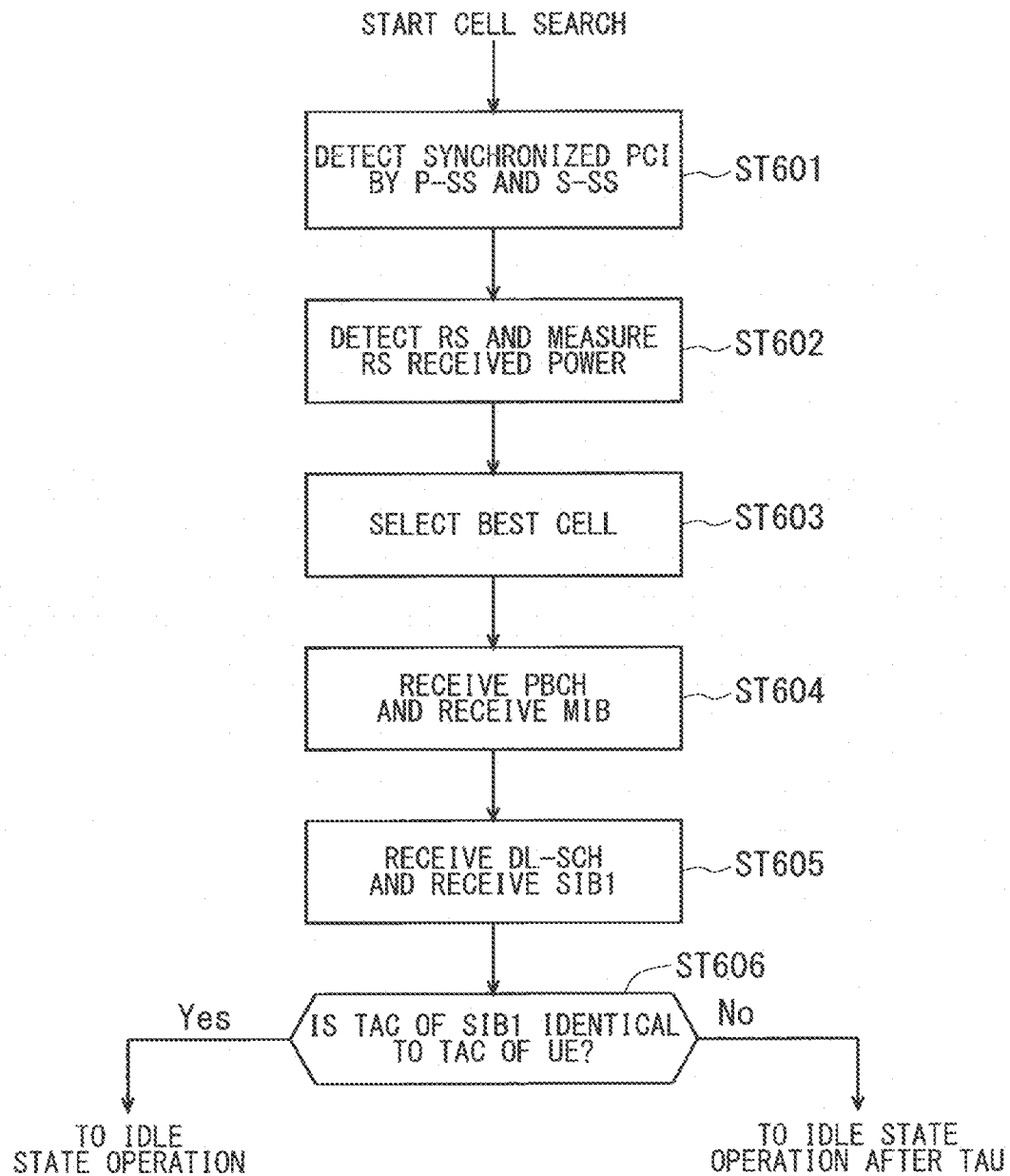
FIG. 6 is a flowchart showing an outline from a cell search to an idle state operation performed by a user equipment (UE) in the LTE communication system.

An example of a cell search method in a mobile communication system is described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

For example, the following description concerns a technology of changing basic beams depending on a change in a communication state to maintain communication.

The 5G system requires large-volume communication and therefore needs to use a wide bandwidth with high carrier frequencies. However, this requires a countermeasure against a propagation loss due to the high carrier frequencies. In order to compensate for the propagation loss, beamforming with a super multi-element antenna not only in the base station but also in the user equipment has been studied. With a multi-element antenna, the following two methods have been studied.

One method is a method in which an analog-to-digital converter (AD) and a digital-to-analog converter (DA) are provided for each antenna element to perform beamforming. It is difficult to secure calculation accuracy due to a low antenna gain. Further, it is known that calculations for enhancing a signal-to-noise ratio (SN ratio) and forming a null of a beam are increased by a cubic order of the number of elements, and a reduction in a processing volume needs to be studied in various ways. Note that the SN ratio may also be hereinafter referred to as SN.

Figure 7:
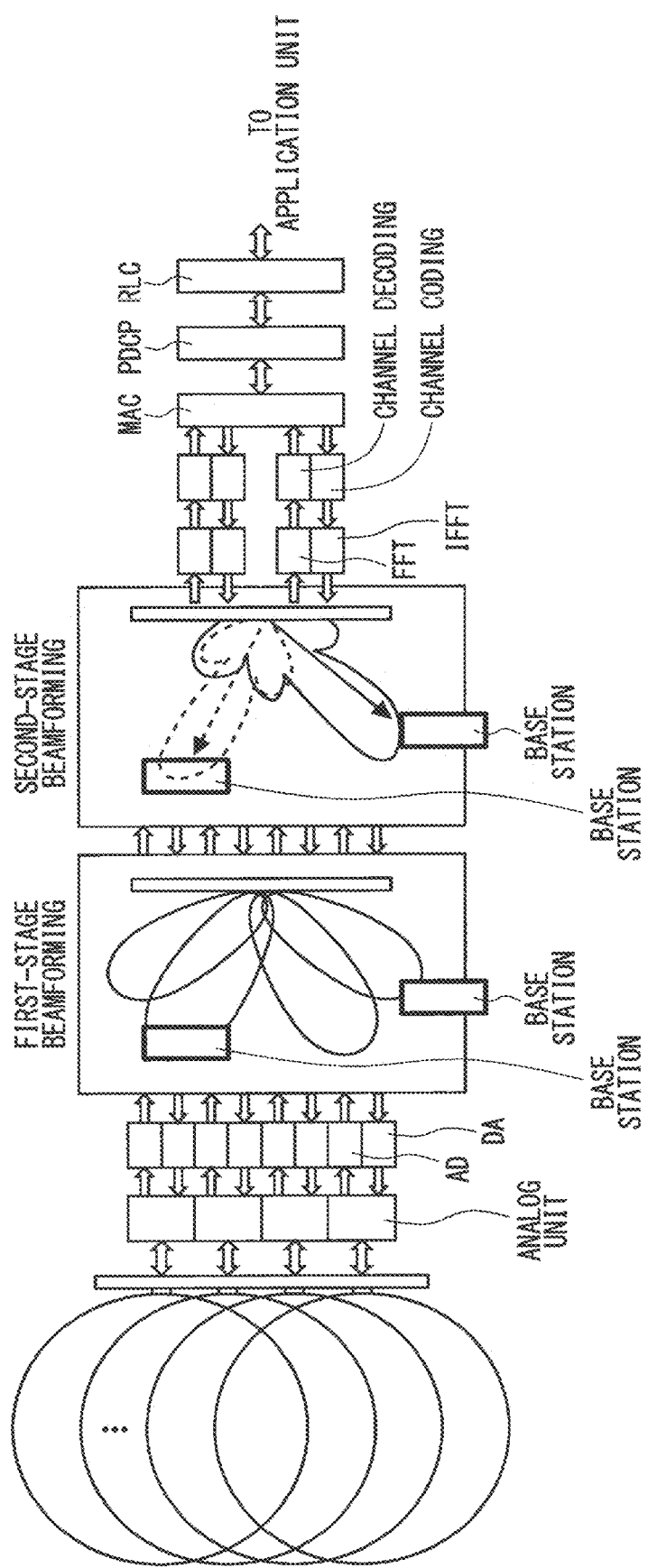
FIG. 7 is a diagram illustrating a method of forming beams in two stages according to a first embodiment.

For example, a method of forming beams in two stages is known. According to a directivity variable antenna, when the same signal is emitted from an element of each antenna in phase, a signal having narrowed directivity in a direction perpendicular (right in front) with respect to an emission plane can be sent out. When the phase of the same signal emitted from each element is adjusted to satisfy an expression of distance between elements×sin θ, beams having a transmission direction (i.e., directivity) deviated by θ can be formed. In this manner, when a plurality of basic beams having narrowed directivity are formed in the first stage to obtain an antenna gain, SN can be enhanced and calculation accuracy can be enhanced. At the same time, due to {number of antenna elements}>{number of first-stage beams}, a calculation amount for forming a null by the first-stage beams can be reduced in the second stage. Refer to FIG. 7.

Figure 8:
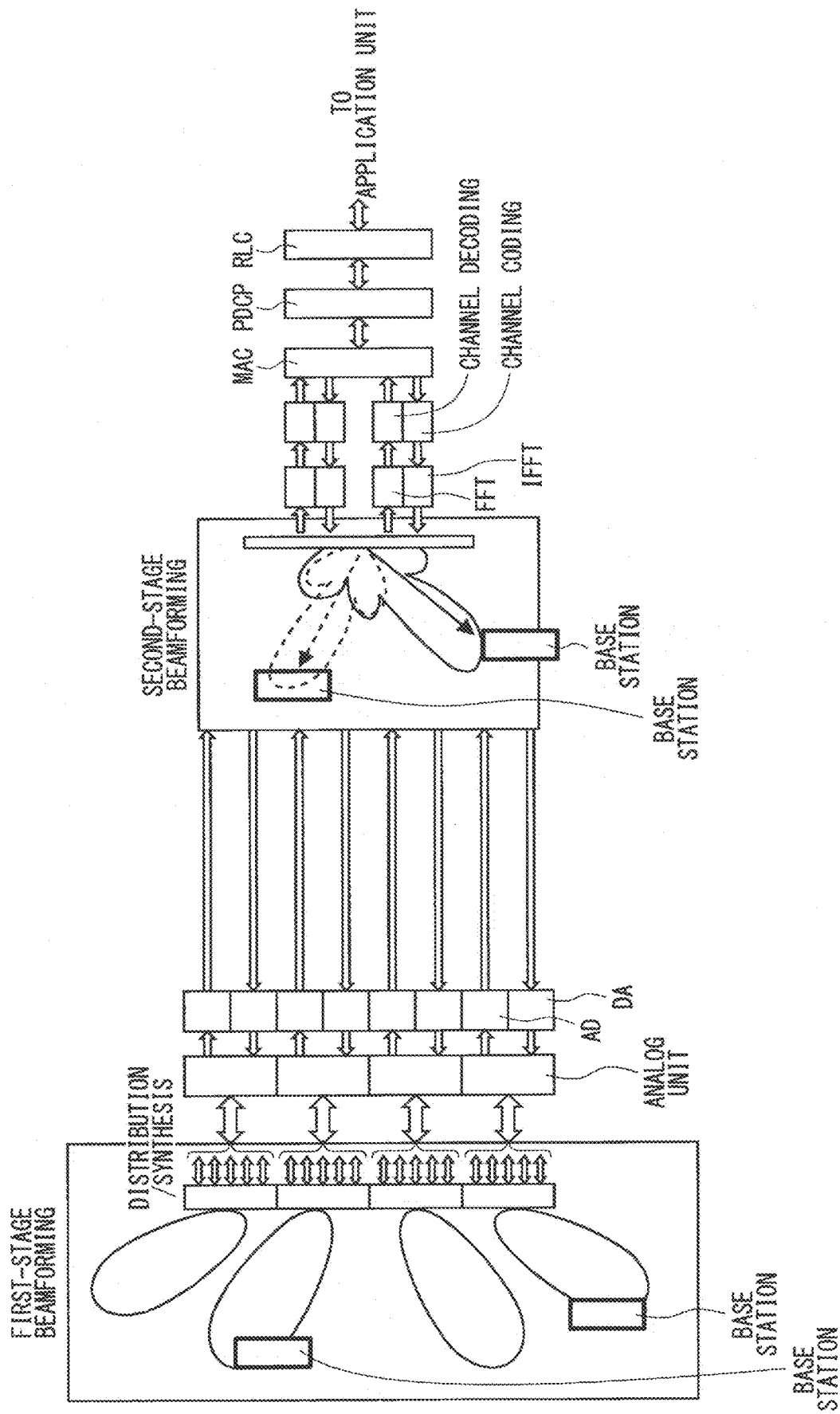
FIG. 8 is a diagram illustrating another method of forming beams in two stages according to the first embodiment.

In another method, a plurality of antenna elements are configured in an analog manner in the first stage to perform desired beamforming. In this case, the first-stage analog beams are formed as beams with narrow directivity by using a horn antenna or a sector antenna, or making the phase variable in an analog manner. The second stage employs a hybrid method of digitally forming the first-stage beams, similar to the above-mentioned first method. Refer to FIG. 8.

With any of the above-mentioned methods, in a case where beams are formed in two stages by both of the base station and the user equipment, when the user equipment uses first-stage beams (n beams) of the user equipment to receive known sequence data transmitted with first-stage beams (m beams) of the base station, the user equipment estimates n×m channels. For example, through diversity and equalization processing performed with use of the estimated channels, throughput is enhanced. Particularly, in order to remove interference between beams, it is efficient to multiply transmission data of the user equipment by inverse characteristics of the above-mentioned n×m channels as a precoding weight to form the second-stage beams. For example, the weight calculation can be done by calculating an inverse matrix of a matrix of the n×m channels. When the transmission data is multiplied by the inverse matrix, only the diagonal elements of the matrix remain to eliminate a cross factor between beams. Thus, interference between beams can be removed.

However, a communication state of the user equipment is changed due to movement or the like, and accordingly the first-stage beams are changed every moment. Therefore, there is a problem that channel estimation fails, and correct precoding cannot be performed in the base station.

The first embodiment solves the above-mentioned problem. For example, the following description concerns re-acquisition at the time of beam disappearance.

Ideally, regarding the first-stage beams of the user equipment, a plurality of first-stage beams cover the whole area. However, when directivity is directed in a non-communication direction, directivity cannot be narrowed in a desired direction. Thus, an antenna gain cannot be obtained. Therefore, it is efficient to orient directivity in a direction of an opposing base station. Alternatively, it is efficient to orient directivity in a direction in which a signal from a base station directly arrives or a direction in which a signal from a base station arrives through reflection and diffraction. Further, it is efficient to direct the first-stage beams to all the base stations and repeaters transmitting a primary synchronization signal (PSS) or a secondary synchronization signal (SSS) other than the base station currently in communication.

Therefore, the user equipment discontinuously transmits a known sequence signal corresponding to a signal called sounding, so that the user equipment can monitor variation of the channels of the base station. This signal is transmitted with the directivity of the first-stage beams. Further, the user equipment may change directivity of the beams when the user equipment does not communicate and thereby sequentially may monitor neighboring spaces as to if channels have not been changed due to movement or the like.

For example, when the channels that can be estimated from the first-stage beams are significantly changed due to movement of the user equipment or tilting of the user equipment, a received signal of the known sequence data from the opposing base station disappears or becomes weak. In this manner, the user equipment detects a change of the channels. When SN is reduced to be smaller than a certain threshold and a change of the channels is detected, if in communication, data communication/sounding communication is stopped, and all of the spaces are monitored by using a time period in which data communication is scheduled. When the known sequence data transmitted by the base station is found, The first-stage beams should be formed to be directed to the base station and to a sounding signal be transmitted.

If there are a plurality of base station antennas in the same direction and a plurality of channels (links) having a low correlation with a plurality of antennas of the user equipment, and the plurality of antennas of the user equipment are directed in the direction, then different pieces of data can be simultaneously transmitted and received from the plurality of antennas, which is efficient.

FIG. 9 illustrates a detailed example of a processing flow.

The user equipment and the base station perform a beam detection procedure St901 at the time of initial synchronization establishment. The base station notifies what sort of frequency, timing, and a code (a seed of a spread code or the like) beams for random access are formed, through broadcast information. The user equipment receives the broadcast information, and performs neighboring cell/beam search based on the received broadcast information. With this, the user equipment monitors the status of channel between each beam of the base station and each beam of the user equipment, and arrange orders the channel in the order of high quality.

Next, the user equipment and the base station perform a communication establishment procedure St902. The user equipment transmits a channel configuration request on a random access channel or the like to an acceptable base station among the base station beams found in St90l. In this case, the user equipment transmits the channel configuration request to the above-mentioned acceptable base station with directivity of the second-stage beams having higher directivity through synthesis with the first-stages beams of the user equipment. Further, the user equipment transmits the channel configuration request, in accordance with a resource (frequency, timing, and a code (a seed of a spread code or the like)) of the base station beams. When the directivity (half width) of the random access is adjusted in accordance with the speed of the neighboring monitor cycle of the user equipment, a change in a propagation environment can be handled, and a probability that communication can be established is enhanced. Specifically, it is also effective to employ A×C/D (°) where A (°) is a usual half width other than random access, C (ms) is the neighboring monitor cycle of the user equipment, and D (ms) is average time for changing by 3 dB under the speed of propagation environment change averaged in a moving UE.

A flow of the procedure St903 and later is a flow of a case where the received signal of the known sequence data (DMRS or CSI-RS) from the opposing base station disappears or becomes weak due to a change of a direction of the user equipment, for example.

In the procedure St903, the user equipment simultaneously performs normal communication and measurement of SN of each beam. The user equipment monitors a known sequence of the first-stage beams when the known sequence is transmitted from the base station with directivity of the first-stage beam, and monitors a known sequence of the second-stage beams when the known sequence is transmitted with directivity of the second-stage beams. SN is measured by monitoring the known sequence. In general, a communication channel is formed with the second-stage beams, and therefore DMRS/CSI-RS transmitted with directivity of the second-stage beams is monitored.

In the procedure St904, the user equipment determines whether or not all of the SNs of the second-stage beams used in communication are equal to or less than a certain threshold that can maintain communication quality.

When a condition that that all of the SNs of the second-stage beams are equal to or less than a threshold is not satisfied, i.e., when at least one SN of the second-stage beams used in communication is greater than the threshold, the user equipment continues the procedure St903.

On the other hand, when all of the SNs of the second-stage beams are equal to or less than the threshold, if the user equipment is in communication, the user equipment stops data communication/sounding communication, and transmits a beam disappearance notification (procedure St905). It is desirable that the beam disappearance notification be transmitted by using a dedicated/shared channel (PUSCH/PUCCH), for the sake of simplification of communication state transition. Alternatively, it is important to not disconnect communication so that random access may be used for the beam disappearance notification. Alternatively, it is important not to disconnect communication and also efficient to maximize the half width or use omni beams as the beams to transmit the beam disappearance notification, from the viewpoint of directivity (half width) of the beams.

The user equipment starts a beam re-detection procedure St906 while waiting for a response to the beam disappearance notification. Further, it is also efficient to maximize the half width or use omni beams as the beam to continue data communication with the base station in the middle of St906. Even when a direction of the base station is lost, the omni beams can be expected to continue communication by reducing a transmission rate.

In a manner described above, when the beam disappearance notification is transmitted from the user equipment, channel quality between beams can be restored soon.

FIG. 10 illustrates an example in which the base station performs beam detection, as well as the user equipment. A flow of FIG. 10 is a flow obtained by adding a procedure in the base station to the flow of FIG. 9. The same reference symbols used for the procedure described in the above is omitted as overlapping description.

The user equipment cannot transmit beams at random when the beams cannot be identified. Even when the user equipment cannot detect beams for a short time period, it is also efficient that the base station waits for a while, considering that the channels will be restored soon. One example of this is a case where a truck passes by between the user equipment and the base station. Therefore, similar to the procedure St903 in the user equipment, the base station measures SN of each beam while performing normal communication in St903b. Then, similar to the procedure St904 in the user equipment, the base station determines whether or not all of the SNs of the second-stage beams directed to the user equipment are equal to or less than a certain threshold that can maintain communication quality in St904b.

When all of the SNs of the second-stage beams are equal to or less than the threshold, the base station activates a timer to wait for start of a beam re-detection procedure in a procedure St907. When beams equal to or greater than the threshold cannot be obtained a predetermined number of times, the time runs out (refer to a loop of the procedures St908, St903b, St904b, and St907), and the base station performs the beam re-detection procedure St906.

Note that, in the procedure St904b, when that condition that all of the SNs of the second-stage beams are equal to or less than the threshold is not satisfied, i.e., when at least one SN of the second-stage beams is greater than the threshold, the base station clears the above-mentioned timer in a procedure St909, and returns to the procedure St903b.

In a manner described above, even when the beam disappearance notification St905 cannot be received from the user equipment, the base station can autonomously start the beam re-detection procedure.

For the sake of simplification, the description above describes an example in which the time runs out based on the number of times the condition of {all of SNs of second-stage beams}<{a threshold} is satisfied in St904b. Instead of this, it is also efficient to employ a method in which a timer is activated in the base station, and the time runs out based on the elapse of a predetermined time period. The time period until the time runs out may be defined by a higher layer device, such as operation administration and maintenance (OAM), or may be stored in non-volatile memory as an activation parameter of the base station.

FIG. 11 illustrates an example of yet another processing flow. A flow of FIG. 11 is a flow obtained by adding a procedure in the MeNB to the flow of FIG. 9. The same reference symbols used for the procedure described in the above to omit overlapping description.

FIG. 11 concerns a case where the base station performs dual-connectivity, and only the MeNB handles a shared channel. According to FIG. 11, when the user equipment determines {all of SNs of second-stage beams}<{a threshold} in the procedure St904, the user equipment transmits the beam disappearance notification to the MeNB, not to an SeNB in communication, in a procedure St1001. In this case, the user equipment transmits a beam disappearance notification to the MeNB with omni beams. After the MeNB receives the beam disappearance notification, the MeNB notifies the SeNB of a beam re-detection command in a procedure St1002. Consequently, the beam re-detection procedure St906 is started.

As described above, when the beam disappearance notification to be notified to the MeNB and a beam re-detection command message to be transmitted to the SeNB are provided, even if the user equipment cannot detect beams, channel quality between beams can be restored soon.

In the examples of FIG. 9 to FIG. 11 here, when a response to the beam disappearance notification is transmitted from the base station to the user equipment with the omni beams or the beams of the maximized half width, repeated transmission of the beam disappearance notification from the user equipment can be stopped. Consequently, efficiency of radio resources in total can be enhanced Next, transmission power for transmitting the beam disappearance notification is described.

In general, when a multi-element antenna is used, narrowing directivity obtains an antenna gain to enable communication even with high carrier frequencies. In an urban case such as a dense-urban model, it is important to narrow directivity so that a transmission signal from the user equipment does not interfere with other base stations not in communication and also from the aspect of enhancing communication capacity in a system totally.

In such a case, when the beam disappearance notification is transmitted with omni-directivity in the example of FIG. 9, the interference can be reduced by configuring the transmission power as follows.

The user equipment transmits a known sequence corresponding to sounding with directivities of the first-stage beams and the second-stage beams, and transmits a known sequence corresponding to sounding with omni-directivity, in order to perform and maintain communication. The transmission may be discontinuously performed in a manner of time, frequency, and a code. The base station performs quality measurement, e.g., SN measurement, of the omni beams, as well as the first-stage beams and the second-stage beams. Even when SN of the omni beams is low, the omni beams are completely in synchronization with the second-stage beams in communication. Thus, SN of the omni beams can be accurately known. It is desirable that the base station notify the user equipment of a result of the SN measurement of the signal transmitted by the user equipment with the omni beams regularly (RRC/PUSCH or PUCCH). When it is time that the user equipment transmits the beam disappearance notification, the user equipment determines transmission power of the omni beams for transmitting the beam disappearance notification, using the SN of the omni beams that is most recently received.

The description above describes an example in which the SN of the omni beams measured by the base station is notified, but information other than the SN may be notified. For example, information of power for the user equipment to transmit the beam disappearance notification with the omni beams may be notified, in consideration of a change of reception performance of a base station, depending on a base station.

For example, it is also efficient to notify by how many more decibels should transmission power of the omni beams be increased (or by how many more decibels may it be decreased) to enable the beam disappearance notification to reach the base station with SN that can be received by the base station.

Alternatively, for example, it is also efficient to notify by how many decibels the omni beams seem lower (or seem higher) than the directivity beams. The user equipment can determine the transmission power, in consideration of a modulation level, a coded rate, or the like in communication, and a modulation level, a coded rate, or the like used for the beam disappearance notification.

As described above, the user equipment monitors SN of the base station in communication, and detects disappearance of a base station signal. When the base station signal disappears, the user equipment notifies the base station of the disappearance of the base station signal with a signal having wide directivity. Consequently, link re-establishment between the base station and the user equipment can be performed soon, and communication can be maintained.

According to the first embodiment, for example, the following configuration is provided.

A communication system including a user equipment, and a base station configured to be connected to the user equipment to perform radio communication with the user equipment is provided. More specifically, the user equipment performs radio communication with a beam. When the user equipment detects a beam disappearance state being a state incapable of maintaining communication quality with the base station, the user equipment transmits a notification of the beam disappearance state with a beam having a wider half width than a half width before detection of the beam disappearance state.

Further, a communication system including a user equipment and a base station configured to be connected to the user equipment to perform radio communication with the user equipment is provided. More specifically, the user equipment performs radio communication with a beam. When the user equipment detects a beam disappearance state being a state incapable of maintaining communication quality with a first base station, the user equipment transmits a notification of the beam disappearance state to a second base station configuring dual connectivity with the first base station. When the second base station receives the notification of the beam disappearance state, the second base station gives a command to the first base station to perform beam re-detection processing with the user equipment.

According to such a configuration, the above-mentioned problem is solved, and the above-mentioned effect can be obtained.

Second Embodiment

For example, the second embodiment involves a technology to maintain a communication by changing basic beams depending on a change in a communication state, and further involves specifying beams of the user equipment.

When beamforming is performed in two stages by both of the base station and the user equipment similar to the first embodiment, if the base station cannot specify beams of the user equipment, throughput is affected. Specifically, the base station receives known sequence data form the user equipment, acquires a channel estimation value from the received data, and determines beams to be formed based on the channel estimation value. However, when the base station cannot specify the beams of the user equipment, there is a problem that the base station cannot determine what sort of beams should be formed to enable improvement in throughput.

For example, when two beams have a high correlation and thus the two beams are hardly separated, it is efficient to transmit the same data, instead of transmitting different pieces of data for each beam. This is because such a manner of transmission enhances SN and improves throughput. On the other hand, if two beams have a low correlation, different pieces of data are transmitted for each beam to gain maximum throughput. Consequently, actual throughput can be enhanced.

In view of this, a technology of enabling identification of beams having different directivities and half widths to perform channel estimation for each beam to gain throughput is illustrated below.

(1) First, the first-stage beams are assigned IDs for enabling identification of beams having different directions and half widths.

When a null is formed in a desired direction by using side lobes to remove interference between beams as in precoding, IDs that can identify beams having different directions and peak powers of the side lobes may be assigned.

Figure 12:
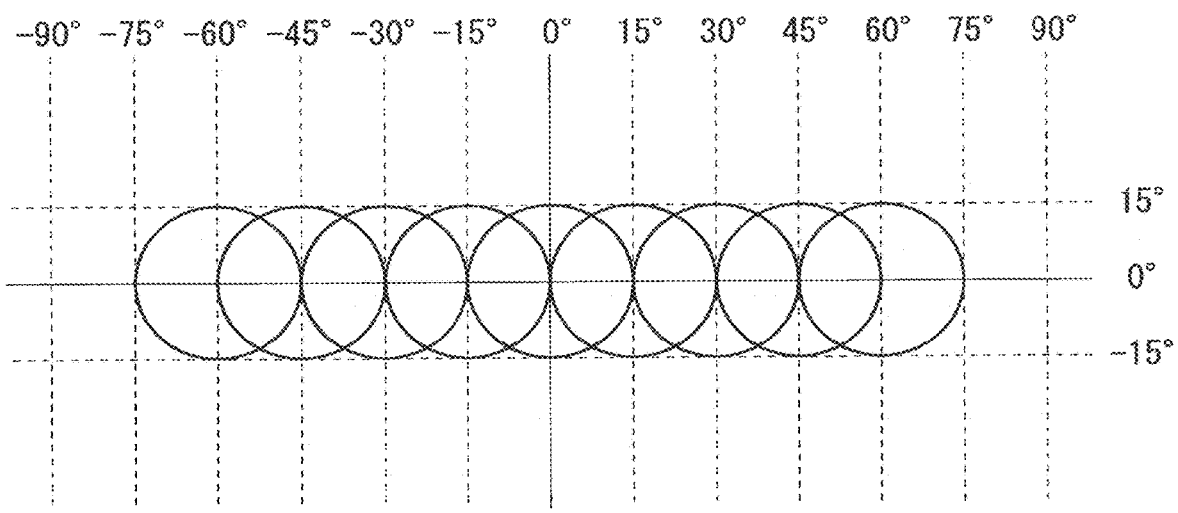
FIG. 12 is a diagram illustrating a first example in which nine beams are formed as first-stage beams according to a second embodiment.
Figure 13:
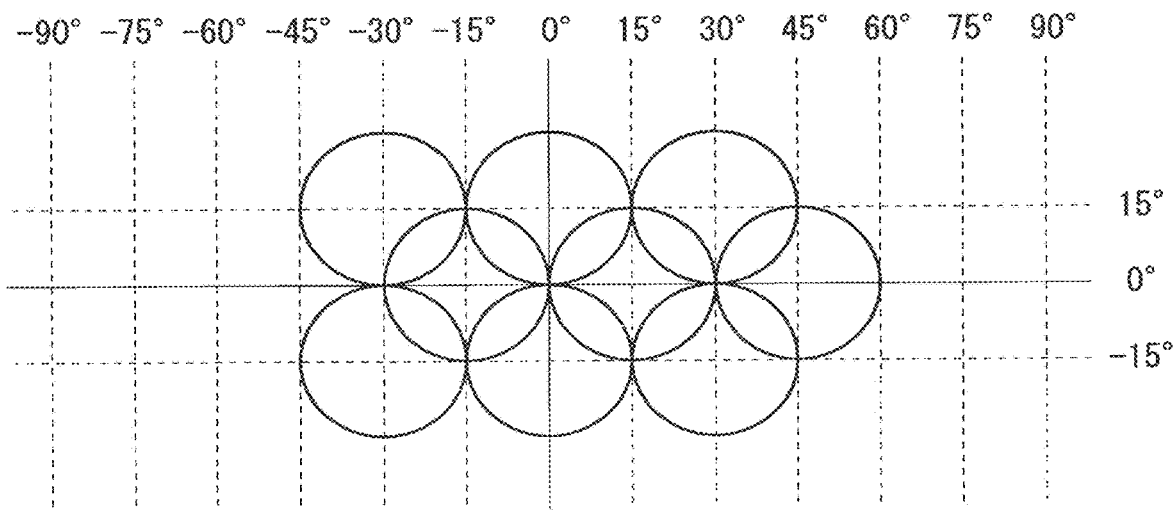
FIG. 13 is a diagram illustrating a second example in which nine beams are formed as the first-stage beams according to the second embodiment.
Figure 14:
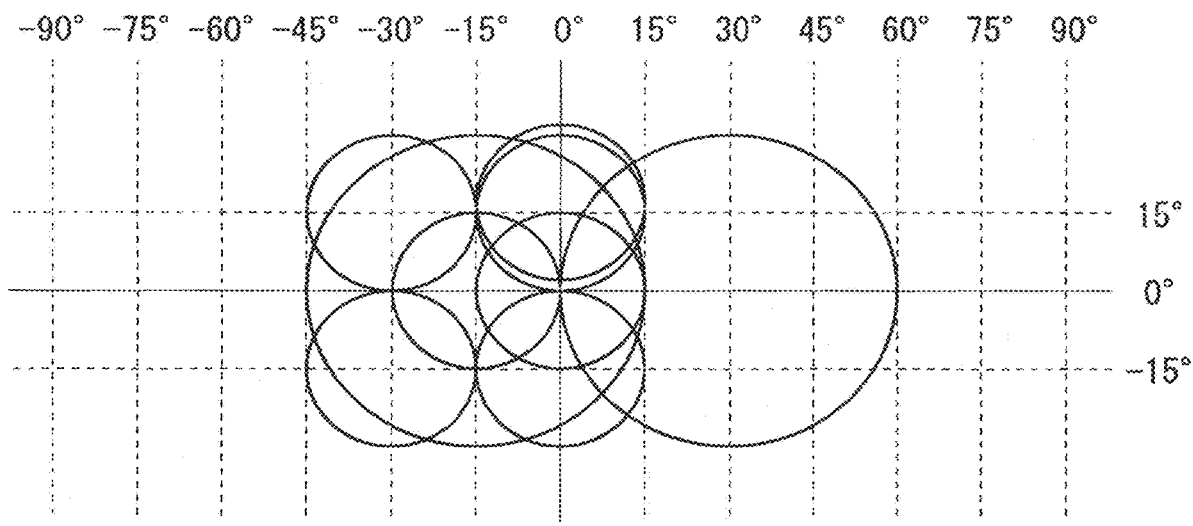
FIG. 14 is a diagram illustrating a third example in which nine beams are formed as the first-stage beams according to the second embodiment.

Examples in which nine beams are formed as the first-stage beams are illustrated in FIG. 12 to FIG. 14, and examples of ID assignment corresponding to FIG. 12 to FIG. 14 are illustrated below.

TABLE 1

ID assignment example corresponding to FIG. 12

| | Beam ID | | | | | | | | |
|---|---|---|---|---|---|---|---|---|---|
| | 1 | 2 | 3 | 4 | 5 | 6 | 7 | 8 | 9 |
| Angle in horizontal direction (°) | −60 | −45 | −30 | −15 | 0 | 15 | 30 | 45 | 60 |
| Angle in vertical direction (°) | 0 | 0 | 0 | 0 | 0 | 0 | 0 | 0 | 0 |
| Half width (°) | 30 | 30 | 30 | 30 | 30 | 30 | 30 | 30 | 30 |

TABLE 2

ID assignment example corresponding to FIG. 13

| | Beam ID | | | | | | | | |
|---|---|---|---|---|---|---|---|---|---|
| | 1 | 2 | 3 | 4 | 5 | 6 | 7 | 8 | 9 |
| Angle in horizontal direction (°) | −30 | 0 | 30 | −15 | 15 | 45 | −30 | 0 | 30 |
| Angle in vertical direction (°) | −15 | −15 | −15 | 0 | 0 | 0 | 15 | 15 | 15 |
| Half width (°) | 30 | 30 | 30 | 30 | 30 | 30 | 30 | 30 | 30 |

TABLE 3

ID assignment example corresponding to FIG. 14

| | Beam ID | | | | | | | | |
|---|---|---|---|---|---|---|---|---|---|
| | 1 | 2 | 3 | 4 | 5 | 6 | 7 | 8 | 9 |
| Angle in horizontal direction (°) | −30 | 0 | 0 | −15 | 15 | 45 | −30 | 0 | 30 |
| Angle in vertical direction (°) | −15 | −15 | −15 | 0 | 0 | 0 | 15 | 15 | 15 |
| Half width (°) | 30 | 30 | 30 | 30 | 30 | 30 | 30 | 30 | 30 |

According to the ID assignment examples, it can be known that the beam IDs=4, 5 have the same direction but have different half widths, and therefore are assigned different IDs.

Further, it can be known that the beams of the beam IDs=2, 3 are emitted to the same area but have different beam IDs. This is effective when an antenna corresponding to the beam ID=2 and an antenna corresponding to the beam ID=3 are sufficiently away from each other and are in a low correlation. Therefore, it is efficient when there are a large number of users in the area or when there is a user using high speed transmission. For example, under a configuration of forming the first-stage beams in an analog manner as in FIG. 8.

Figure 15:
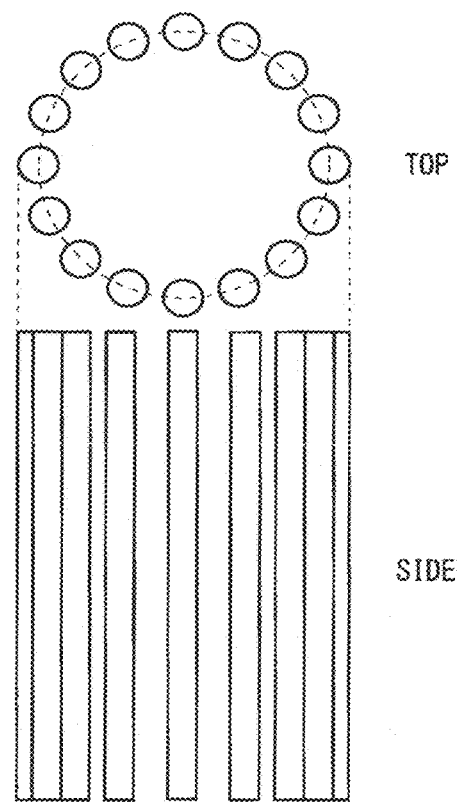
FIG. 15 is a diagram illustrating an antenna in which a plurality of basic elements (dipole antennas or the like) are arrayed in a circular shape according to the second embodiment.

FIG. 12 to FIG. 14 illustrate examples of a relationship between directivity and a half width of a planar antenna, concerning directivity in a range from −90° to +90°. In contrast, configuring directivity and a half width in a range from −180° to +180° is also possible, according to a configuration in which a dipole antenna, a helical antenna, or the like is used as a basic element, and a plurality of basic elements are arrayed in a circular shape (i.e., a cylindrical shape) as in the example of FIG. 15, and the first-stage beams are digitally formed.

Here, the user equipment is different from the base station in that the user equipment significantly changes a direction as time elapses, and in that surroundings of the user equipment change. Therefore, a situation in which the channels change and are not restored to the original state frequently occurs. In view of this, it is effective that the user equipment monitors SN of the known sequence signal from the base station to detect whether or not there is a significant change in the channels, and when it is determined that there has been a significant change in the channels, different beam IDs are assigned. According to this, misuse of channel information detected from the same beam ID before the change of the channels can be avoided.

In this manner, new beam IDs are successively assigned. Thus, when p beam IDs are cyclically used (1, 2, . . . , p, 1, 2, . . . ), p or more beam IDs can be secured, where p is the number of beam IDs that can be configured for the first-stage beams. Consequently, the number of information bits can be limited even when the number of IDs is large. Thus, transmission efficiency can be increased. For example, when the beam IDs are assigned with zero-based numbering and p=256, a configuration of the beam IDs=0 to 255 is employed, and the beam IDs can be transmitted with 8 bits. The control information is an overhead, and is repeatedly transmitted together with data (U-plane data) used by the user, and thus reduction in the number of bits even by 1 bit can enhance transmission efficiency.

The upper limit p of the number of IDs is notified from the base station by using broadcast information or RRC (corresponding to RRC Connection Re-configuration in 3GPP) at the time of channel configuration.

Alternatively, it is also effective to prepare as many IDs as a doubled number of IDs that can be configured for the first-stage beams (i.e., prepare two sets of IDs), and use another set of IDs (i.e., toggle the two sets of IDs to be used) at the time of changing the beam IDs. The IDs to be used when to change the beam IDs are notified from the base station by using broadcast information or RRC (corresponding to RRC Connection Reconfiguration in 3GPP) at the time of channel configuration.

(2) Next, means for matching recognition of the beam IDs between the user equipment and the base station is described.

The first method is a method in which numbers of the beam IDs are transmitted as data, and in this case, the beam ID data is transmitted with a beam having directivity and a half width corresponding to the beam IDs to be transmitted. The beam ID data may accompany the user data as a control channel (corresponding to PUCCH in 3GPP). The base station demodulates the control channel, and when the CRC is okay, the base station can extract beam IDs of the beam.

The second method is a method in which, unlike transmitting the beam IDs as data, association between the beam IDs and a transmission condition of the beam IDs (a transmission timing, a transmission frequency, etc.) is configured in RRC in advance. (corresponding to RRC Connection Reconfiguration in 3GPP), and the base station identifies the beam IDs based on the beam transmission condition (i.e., based on a detection timing, a reception frequency, etc.)

For example, an offset of a transmission cycle of the sounding signal transmitted by the user equipment with respect to a reference timing of the base station is configured in RRC in advance. For example, an offset number for specifying the offset is a symbol number from a head of a frame. Alternatively, when a position to insert the sounding signal is fixed for each slot, a slot number may be used as an offset signal. An example is illustrated in a table below. Note that one example of a cycle is also illustrated.

TABLE 4

|  | Beam ID | | | | | |
| --- | --- | --- | --- | --- | --- | --- |
|  | 1 | 2 | 3 | 4 | 5 | 6 |
| Offset number | 5 | 19 | 23 | 37 | 51 | 65 |
| Cycle | 100 ms | 100 ms | 100 ms | 100 ms | 100 ms | 100 ms |

Next, as in OFDM, an example of a case of enabling different transmissions per frequency is illustrated. When only one sub-carrier is transmitted and other sub-carriers are not transmitted, transmission power of the sub-carrier to be transmitted can be increased to improve SN. Such an example is illustrated in a table below. The frequency numbers are one example. In view of the fact that a DC offset error can be reduced by use of a neighbor of the carrier wave when the number of carriers to be transmitted is small, the table below illustrates an example in which the frequency numbers 600 and 601 are used in a case of 1200 sub-carriers.

TABLE 5

|  | Beam ID | | | | | |
| --- | --- | --- | --- | --- | --- | --- |
|  | 1 | 2 | 3 | 4 | 5 | 6 |
| Offset number | 5 | 19 | 23 | 37 | 51 | 65 |
| Frequency number | 600-601 | 600-601 | 600-601 | 600-601 | 600-601 | 600-601 |
| Cycle | 100 ms | 100 ms | 100 ms | 100 ms | 100 ms | 100 ms |

When the first-stage beams are digitally formed, pieces of data having different directivities can be transmitted at the same time, and the sounding signal can be transmitted in a short time period. Such an example is illustrated in a table below. Separating the frequency numbers by 12 is merely one example. An example in which directivity is changed for each resource block in a case where the resource block consists of 12 sub-carriers is illustrated.

TABLE 6

|  | Beam ID | | | | | |
| --- | --- | --- | --- | --- | --- | --- |
|  | 1 | 2 | 3 | 4 | 5 | 6 |
| Offset number | 5 | 5 | 5 | 5 | 5 | 5 |
| Frequency number | 601-612 | 613-624 | 625-636 | 637-648 | 649-660 | 661-672 |
| Cycle | 100 ms | 100 ms | 100 ms | 100 ms | 100 ms | 100 ms |

It is also efficient to change the transmission cycle depending on the half width of the beam. For example, even when the half width is doubled, total energy is the same as long as the cycle is ½. An example in which a doubled half width is assigned to the beam ID=1 is illustrated in a table below. The cycle or the half width may be specified by a frame number, a slot number, or a symbol number, instead of actual time.

TABLE 7

|  | Beam ID | | | | | |
| --- | --- | --- | --- | --- | --- | --- |
|  | 1 | 2 | 3 | 4 | 5 | 6 |
| Offset number | 5 | 19 | 23 | 37 | 51 | 65 |
| Cycle | 50 ms | 100 ms | 100 ms | 100 ms | 100 ms | 100 ms |

Further, as for the cycle, it is efficient to configure a short cycle depending on the speed at which neighboring channels change. Therefore, a change speed of the channels may be monitored, and a configuration value may be changed depending on a monitoring result. As an index for monitoring the change of the channels, a Doppler frequency measured in the base station for each user equipment may be used. Alternatively, information about SN [change speed of SN, variability (dispersion) of SN, or the like] from the opposing device may be acquired in the base station or the user equipment, and such information may be used as the index for monitoring the change of the channels. When it is determined that a change is needed, re-configuration is performed with RRC (corresponding to RRC Connection Reconfiguration in 3GPP).

The third method is a method in which, as the data to be transmitted, an orthogonal code/quasi-orthogonal code using the beam ID as a seed, such as a Gold code and an Hadamard code, is used. The sounding signals of a plurality of beams can be simultaneously transmitted, and thus an information amount for transmitting the beam IDs being an overhead for the U-plane data can be reduced. Further, when beam directions are different, the effect of space division multiplex (SDM) can be taken into consideration for the simultaneously transmitted sounding signals, and SN can be further improved than simply spreading the code. Association between the seed of the orthogonal code/quasi-orthogonal code and the beam IDs are configured in advance in RRC (corresponding to RRC Connection Reconfiguration in 3GPP), and the base station identifies the beam IDs with a detectable seed.

In the above-mentioned first to third methods, to change the beam IC assignment in association with a significant change of the channels between the base station and the user equipment, a method of re-configuring RRC (corresponding to RRC Connection Reconfiguration in 3GPP) at the time of the change or a method of transmitting beam IDs for re-detection in advance is effective.

Alternatively, when IDs for re-detection are transmitted in advance, a message which has included as many IDs as a multiple of the number of IDs that can be configured in first-stage beams is transmitted. The user equipment uses different sets of IDs at the time of changing the beam IDs. The base station detects IDs of beams out of a plurality of beam IDs in a blind manner. When the base station detects that the beam IDs have been changed, the base station stops and discards processing of integrating channel information detected from previous beam IDs, and calculates new channel information. An example of the number of IDs that can be configured for the first-stage beams=6 and the number of sets of IDs=2 is illustrated in a table below.

TABLE 8

| Beam ID set 1 | | | | | |
|---|---|---|---|---|---|
| 1 | 2 | 3 | 4 | 5 | 6 |
| Beam ID set 2 | | | | | |
| 129 | 130 | 131 | 132 | 133 | 134 |
| Offset number 5 | 19 | 23 | 37 | 51 | 65 |
| Cycle 50 ms | 100 ms | 100 ms | 100 ms | 100 ms | 100 ms |

The above-mentioned identification methods of the beam IDs are more effective when used in combination.

For example, associating with a transmission timing, a transmission frequency and others should be configured for each user equipment in RRC in advance, and an orthogonal code/quasi-orthogonal code using the beam ID as a seed, such as a Gold code and an Hadamard code, should be used. According to this, even when a propagation environment is stable, a timing of a beam ID signal and a resource such as a frequency need not be constantly occupied. Therefore, transmission frequency of the beam IDs of which propagation function needs to be updated along with the variation of the propagation environment can be selected.

Through the above-mentioned methods, recognition of the beam IDs can match between the base station and the user equipment.

Further, through the above-mentioned methods, the base station can detect a change of IDs of beams transmitted by the user equipment. Therefore, it is also efficient to determine beam disappearance when the base station detects a change of the beam IDs, without transmitting the beam disappearance notification (refer to St905 and St1001) described in the first embodiment.

(3) Next, two-stage detection means of the beam IDs is described.

When the beam IDs are transmitted as data, a known sequence common to all of the user equipments and common to all of the beam IDs should be also simultaneously transmitted. Alternatively, instead of the simultaneous transmission, the beam ID data and the above-mentioned common known sequence should be transmitted by using a resource close to the extent of not changing the channel (a timing immediately before transmitting the beam ID in a radio format or the like). The base station determines signal quality by using SN or the like to detect whether or not there is a beam. Only when the base station determines that there is a beam, the base station performs beam ID identification for the user equipment that the base station allows transmission. Consequently, detection processing of the base station can be reduced.

The known sequence common to all of the user equipments and to all of the beam IDs is notified from the base station with broadcast information or a medium corresponding to RRC Connection Reconfiguration in 3GPP.

Alternatively, when the beam IDs are transmitted as data, a known sequence that is different for each user equipment and common to all of the beam IDs used by the user equipments should be transmitted. The base station performs beam ID identification of the user equipment only when the base station detects such a known sequence. Consequently, detection processing of the base station can be further reduced.

The known sequence common to all of the beam IDs used by the user equipments is notified from the base station with broadcast information or a medium corresponding to RRC Connection Reconfiguration in 3GPP.

Further, it is also efficient to sort the user equipments into some groups, share a resource such as a timing and a frequency within the groups, and use a group ID for each group. In this case, in order not to overlap the beam IDs in the user equipments, association between the beam ID and the resource (a transmission timing, a frequency, etc.) is configured in RRC in advance. Although some user equipments need to suddenly search for many beam IDs again due to dropping and a direction change, in view of the fact that there are also user equipments such as user equipments installed in a vending machine that are not assumed to move, grouping can reduce radio resources due to the statistical multiplexing effect.

The known sequence for the group IDs is notified from the base station with broadcast information or a medium corresponding to RRC Connection Reconfiguration in 3GPP.

When two or more, out of the known sequence common to all of those user equipments and common to all of the beam IDs, the known sequence common to all of the beam IDs used by those user equipments, and the known sequence for the group IDs, are used in combination, detection processing of the base station can be further reduced.

According to the second embodiment, for example, the following configuration is provided.

A communication system including a user equipment, and a base station configured to be connected to the user equipment to perform radio communication with the user equipment is provided. More specifically, the user equipment performs radio communication with a two-stage beamforming method by using a multi-element antenna. The user equipment transmits information for identifying an attribute of each first-stage beam to the base station.

According to such a configuration, the above-mentioned problem is solved, and the above-mentioned effect can be obtained.

Third Embodiment

For example, the third embodiment concerns a countermeasure against interference with another base station.

The first and second embodiments mainly describe beamforming of uplink (the user equipment→the base station). The third embodiment describes beamforming of the user equipment to improve throughput of downlink (the base station→the user equipment).

It is known that a method in which the base station acquires downlink channel information from a received uplink signal by using reciprocity, and calculates a precoding weight based on the acquired downlink channel information, and multiplies downlink transmission data by the calculated precoding weight is effective to enhance throughput. However, data transmitted in such a way does not consider an interference component from another base station, and thus there is a problem that cannot gain an expected throughput.

Solutions to this problem is described below.

The first method is a method in which interference information from another base station other than the base station in communication is measured by the user equipment, and the information is fed back to the base station in communication.

The user equipment receives the transmission data multiplied by the precoding weight and transmitted by the base station in communication while the user equipment reduces interference from another base station as much as possible by using a degree of freedom of the antenna of the user equipment with post-coding or the like. However, for example, even if post-coding or the like is performed, when a degree of freedom of the antenna is insufficient or when a signal (including a reflected wave) of the base station in communication and a signal from other base stations not in communication come from similar directions, interference from the base stations not in communication remains.

In view of this, an insufficiency value indicating insufficiency with respect to required SN, or an interference amount from other base stations not in communication is fed back to the base station in communication. When the base station in communication increases transmission power based on the feedback information, throughput can be enhanced. When transmission power is adjusted based on the feed-back information for each user equipment in such a manner, total transmission power transmitted by the base station in communication can be reduced, as compared to a case where transmission power is uniformly increased in the base station in communication.

Feedback methods are described.

Information to be fed back is notified to the base station from the user equipment with a medium corresponding to a measurement report of RRC in 3GPP. This is different from a measurement report used in neighboring cell monitoring in 3GPP for handover or the like in that it is not a report of reception power of a neighboring base station, specifically in that an interference amount from other base stations not in communication is measured with respect to data transmitted by the base station in communication with beams having appropriate directivity and received with the beams having appropriate directivity formed by the user equipment. When the user equipment detects a PSS and an SSS of another base station not in communication, the user equipment stores the detection timing, frequency, or the like for each cell ID, and measures how much interference there will be if the signals are received with the beams having appropriate directivity formed by the user equipment between the user equipment and the base station in communication.

The information to be fed back may be a message element accompanying the measurement report of RRC in 3GPP.

When precoding processing is calculated through inverse matrix calculation of a channel matrix, a processing volume is large, and thus high-performance DSP or a large-scale LSI is required to perform the calculation in time for fading. In view of this, RRC is effective because an average value of the interference component from other base stations not in communication can be compensated for, although reflection cycle may be long.

The description above describes a method of compensating for an average interference amount from another base station not in communication, by using a medium corresponding to the measurement report. In contrast, when the insufficiency value indicating insufficiency with respect to required SN or the interference amount from other base station not in communication is fed back to the base station in communication by using the PUCCH or the L control signal in 3GPP, the feed-back information can be performed in a short time period. Therefore, variation of the fading can be compensated for, and more stable communication can be performed. Further, when a transmission power increase/decrease request command (e.g., 1:1 dB increase, 0:1 dB decrease, or +1: increase required, 0: change not required, −1: decrease possible) is employed to feed back the command, it is effective to reduce an information amount of the feedback.

The second method is a method in which adjustment is preformed such that data transmission from a plurality of base stations is not simultaneously performed, by using the information about how much interference there will be if receiving signals with the beams having appropriate directivity formed by the user equipment between the user equipment and the base station in communication (information corresponding to a measurement report of RRC in 3GPP).

The base station in communication notifies neighboring base stations having the cell IDs notified from the user equipment of information about a resource (a timing, a frequency, a spread code, a resource block, or the like) of which use is not desired or of which use should be refrained from, through a message between the base stations. The message between the base stations may be transmitted via a higher layer device of the base station. The base station in communication uses the resource notified in the message between the base stations to transmit data to the user equipment.

Alternatively, the base station in communication notifies neighboring base stations having the cell Is notified from the user equipment of information about a resource (a timing, a frequency, a spread code, a resource block, or the like) of which use is desired in a case of performing some transmission, through a message between the base stations. The message between the base stations may be transmitted via a higher layer device of the base station. The base station in communication avoids using the resource notified in the message between the base stations as much as possible to transmit data to the user equipment.

The third method is a method which the first-stage beams are formed by the user equipment as in the following manner to solve the above-mentioned problem.

Specifically, the user equipment does not transmit a sounding signal as it is with the first-stage beams whose transmission direction and half width are simply configured, but transmits a signal configured in the following steps.

(A1) One first-stage beam (beam with which known sequence data is received) is formed so that a main beam is directed to the base station in communication and that a null is directed to another base station other than the base station in communication.

As the said other base station other than the base station in communication, only a base station using reception power having a magnitude of influencing communication or a larger magnitude should be selected. For example, required SN depending on a received modulation scheme, coded rate, or the like is used as a threshold.

(A2) The user equipment, if possible, forms another first-stage beam, in addition to the beamforming of the above-mentioned (A1), having directivity different from the above-mentioned (A1) so that a null is directed to other base stations not in communication.

(A3) The user equipment, if possible, forms another first-stage beam, in addition to the beamforming of the above-mentioned (A1) and (A2), having directivity different from the above-mentioned (A1) and (A2) so that a null is directed to other base stations not in communication.

(A4) Similar to the above-mentioned (A2) and (A3), a first-stage beam having different directivity that a null is directed to other base stations not in communication is added.

Alternatively, a signal configured in the following steps may be transmitted.

(B1) The user equipment provisionally determines the number of beams to be configured in a direction of a multipath from a received signal of the base station in communication.

(B2) Beams are formed so that a main beam is directed to the multipath of the above-mentioned (B1) and that a null is directed to other base stations not in communication. When an inverse matrix can be calculated, the beamforming is completed.

(B3) When an inverse matrix cannot be calculated because a direction of the main beam and a direction of other base station in communication cannot be separated, corresponding multipaths are reduced to recalculate the inverse matrix. In this case, the multipaths are preferentially reduced from a direction close to the said base station.

(B4) The above-mentioned (B3) is repeated.

Figure 16:
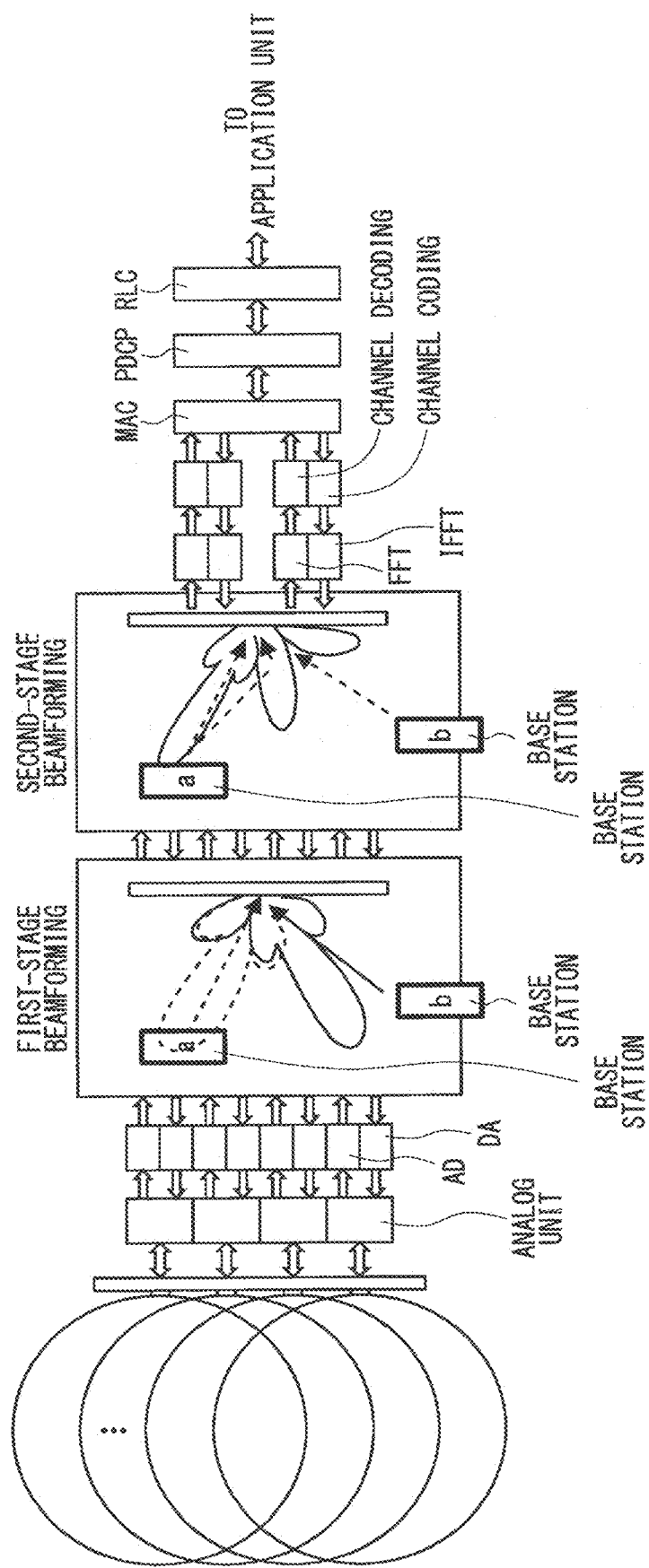
FIG. 16 is a diagram illustrating directivity of beams in two-stage beamforming according to a third embodiment.

FIG. 16 illustrates an image of antenna formed in the above.

The base station performs precoding as usual.

According to the example of FIG. 16, the user equipment provides one beam directed to a base station a as a first-stage beam for transmitting a known sequence (refer to the beam indicated by the broken line). The beam directs a null to a base station b. Another beam (refer to the beam indicated by the solid line) directs a null to both the base station a and the base station b. Precoding a signal of the base station to these two beams makes the directivity of the beams including multipaths of the base station better. In addition, it makes a null orienting to the base station b so that a configuration in the user equipment does not accept interference received from the base station b. As a result of the above, expected throughput can be gained.

When the configuration as described above is employed, interference from other base stations not in communication can be reduced, and normal communication can be performed.

According to the third embodiment, for example, the following configuration is provided.

A communication system including a user equipment, and a base station configured to be connected to the user equipment to perform radio communication with the user equipment is provided. More specifically, when the user equipment communicates with a first base station while not communicating with a second base station, the user equipment measures a degree that the second base station interferes with a transmission signal from the first base station, and transmits a measurement result to the first base station. The first base station changes transmission power of a signal to be transmitted to the user equipment, based on a received measurement result.

Further, a communication system including a user equipment and a base station configured to be connected to the user equipment to perform radio communication with the user equipment is provided. More specifically, when the user equipment communicates with a first base station while not communicating with a second base station, the first base station adjusts a communication condition for interference suppression between data transmission from the first base station to the user equipment and data transmission performed by the second base station, and requests the second base station to perform data transmission on the adjusted communication condition.

Further, a communication system including a user equipment, and a base station configured to be connected to the user equipment to perform radio communication with the user equipment is provided. More specifically, the user equipment performs radio communication with a two-stage beamforming method by using a multi-element antenna. When the user equipment communicates with a first base station while not communicating with a second base station, the user equipment forms, as first-stage beams, a first beam having a main beam directed to the first base station and a null directed to the second base station, and at least one second beam having a null directed to the second base station and having directivity different from directivity of the first beam.

Further, a communication system including a user equipment, and a base station configured to be connected to the user equipment to perform radio communication with the user equipment is provided. More specifically, the user equipment performs radio communication with a two-stage beamforming method by using a multi-element antenna. When the user equipment communicates with a first base station while not communicating with a second base station, the user equipment designs at least one beam having a main beam directed to a direction of a multipath of the first base station and having a null directed to the second base station by adjusting a configuration number of the multipath, and forms the designed beam as a first-stage beam.

According to such a configuration, the above-mentioned problem is solved, and the above-mentioned effect can be obtained.

Fourth Embodiment

For example, the fourth embodiment concerns dealing with reciprocity capability.

When beams are formed with a multi-element antenna, the base station needs to be notified of channel information measured for each beam by the user equipment, and similarly, the user equipment needs to be notified of channel information measured for each beam by the base station. Therefore, there is a problem that an information amount is large.

Further, high frequencies are desired for ensuring a continuous frequency band; however, as the frequency gets high, proportionally a fading frequency gets high. In view of this, to follow a change of the channels, the user equipment and the base station need to have a short transmission cycle concerning the channel information notified to each other.

To solve these, channel estimation using reciprocity of the channels of transmission and reception has been discussed, with the background of time division duplex (TDD: transmission and reception with the same frequency), while, there is a problem in that a device having a capability of reciprocity needs to have the same beam pattern in transmission and reception, and thus implementation is difficult.

In view of this, the fourth embodiment provides a communication technology of enabling configuration of capability of reciprocity for each frequency band, and describes that high speed communication is enabled in a frequency band having capability of reciprocity even when the entire bandwidth does not have capability of reciprocity.

FIG. 17 illustrates a sequence diagram illustrating an example in which configuration of capability of reciprocity for each frequency band is performed at the time of channel configuration. According to FIG. 17, the user equipment transmits reciprocity capability information for each frequency band as UE-capability to the base station at the time of location registration (Steps St1601 to St1603). In this case, the reciprocity capability information is transmitted with a medium corresponding to RRC Connection Setup Complete in 3GPP (corresponding to a response to a channel configuration request or a change request).

At the time of starting connection for data communication or the like (Step St1604), the base station determines reciprocity capability and capable transmission efficiency for each cell ID and for each frequency band and starts preparation in the base station. Further, the base station notifies the user equipment of configuration information of precoding capability for each frequency band through a medium corresponding to RRC Connection Setup (Step St1606).

For example, when the 2 GHz band is used only for a control signal and wide band transmission of U-plane is performed with a wider bandwidth (such as 15 GHz, 28 GHz, 60 GHz) different from 2 GHz by using a multi-element antenna, 2 GHz does not require reciprocity, and simple transmitter/receiver is used. Securing reciprocity requires calibration for matching beam patterns of transmission and reception, and also requires matching of frequency characteristics of transmission and reception. Thus, when reciprocity is not required even in the 2 GHz band, a low-cost user equipment can be achieved.

The base station determines capability of reciprocity based on UE-capability for each frequency band transmitted from the user equipment and capability of the base station itself for each ID. Channel estimation using reciprocity is used only in a frequency bandwidth in which both of the base station and the user equipment have capability of reciprocity. Precoding is also performed using this channel estimation value.

As for a frequency in which either of the base station or the user equipment does not have capability of reciprocity, there are options (i) to (iii) shown below.

(i) Reciprocity is not used. The base station gives a command so that the user equipment transmits the measured channel estimation value to the base station, and the base station performs interference removal such as precoding.

(ii) Reciprocity is not used. The user equipment calculates what sort of configuration of phase and amplitude for each beam of the base station reduces interference, based on the channel estimation value measured by the user equipment. The base station gives a command so that the user equipment transmits the result to the base station, and the base station performs precoding based on the acquired information.

(iii) The base station does not perform processing for reducing beam interference such as precoding.

Configuration information of precoding capability is described below. When precoding is performed by using reciprocity, the base station specifies information (a frequency, time (a cycle), a position of a resource block, or the like) for enabling the user equipment to transmit sounding, through a medium corresponding to RRC Connection Setup.

Specifically, in a case of the above-mentioned (i), the base station specifies a radio format, a measurement cycle, or the like for reporting a value of downlink channel estimation measured by the user equipment, through a medium corresponding to RRC Connection Setup. The user equipment notifies of the measurement information in accordance with the command of the base station, instead of transmitting sounding.

In a case of the above-mentioned (ii), the base station specifies with what sort of radio format and cycle the base station makes the user equipment report information of phase and amplitude for each beam of the base station or index information indicating a combination of phase and amplitude for each beam, through a medium corresponding to RRC Connection Setup. The user equipment notifies of the information in accordance with the command of the base station, i.e., the information of phase and amplitude for each beam or the index information about a combination of phase and amplitude for each beam, instead of transmitting sounding.

In a case of the above-mentioned (iii), the specification as described above is not conducted. Alternatively, the base station indicates that the configuration of precoding capability is unnecessary, through a medium corresponding to RRC Connection Setup. Transmission in Step St1609 is not performed. Calculation in Step St1609 is not performed as well. Therefore, Step St1611, i.e., U-plane data transmission with precoding, is not performed.

Here, when precoding is performed by using reciprocity, reciprocity requires different performance depending on transmission efficiency of information. The transmission efficiency of information is determined depending on a modulation and coding scheme (MCS), the number of capable layers (the number of streams of signals simultaneously transmitted at the same frequency), or the like. For example, when the base station has capability of a scheme of up to 64 QAM and a coded rate of up to $3/4$, even if the user equipment has capability of a scheme of up to 256 QAM and a coded rate of up to $5/6$, an actual scheme of the user equipment is up to 64 QAM and a coded rate of up to $3/4$.

The base station uses the sounding signal of Step St1609 to calculate a precoding weight (Step St1610). After the processing, the base station performs precoding on downlink data to transmit the downlink data.

Note that, when the base station transmits data before Step St1610, the base station transmits data without precoding.

When the reciprocity capability information is transmitted as UE-capability of the user equipment from the user equipment to the base station as described above, even if reciprocity capabilities of the user equipment and the base station coexist, precoding can be performed with capable transmission efficiency. Particularly, when reciprocity capability information is provided for each frequency band, even if reciprocity capabilities coexist for each frequency band in one user equipment, precoding can be performed with capable transmission efficiency.

Figure 18:
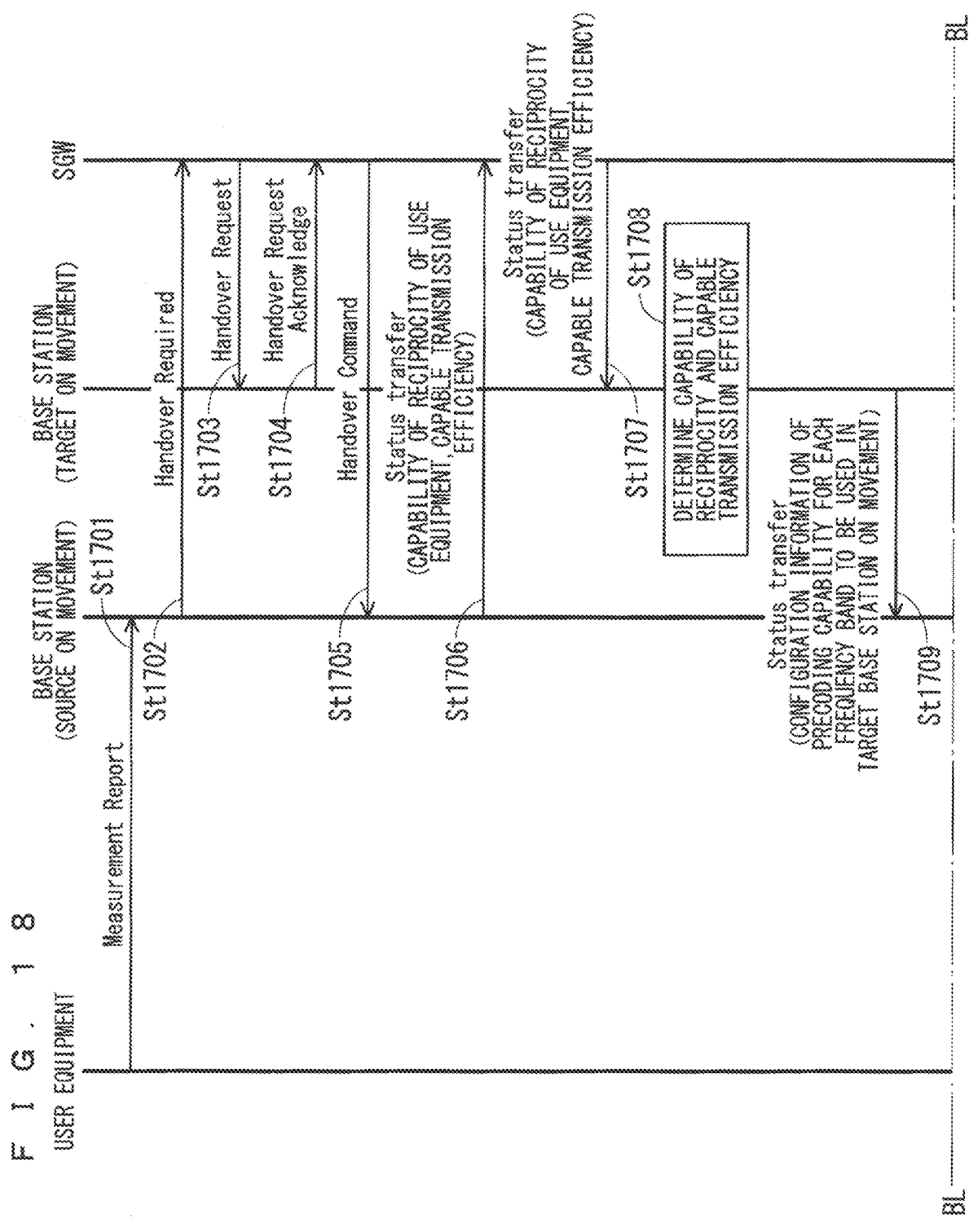

FIG. 18 to FIG. 19 illustrate a sequence diagram illustrating an example of performing configuration of reciprocity capability for each frequency band at the time of handover. FIG. 18 and FIG. 19 are connected at the position of the border line BL. Exchanges of capabilities of a frequency band that can be used in a destination (destination after handover) are performed, and the base station determines whether reciprocity up to a value with lower transmission efficiency is used, or channel estimation is performed without using reciprocity. The determination result is notified, and then communication of U-plane data is started.

When the user equipment transmits a measurement report (Step St1701) and a source base station on movement determines that communication quality has deteriorated worse than a certain threshold based on the measurement report, a source base station on movement notifies an SGW (a serving gateway) of Handover Required (Step St1702). The SGW notifies the target base station on movement of a Handover Request (Step St1703) depending on the details of the Handover Required. After the SGW receives a notification from the target base station on movement that handover is possible (Step St1704), the SGW notifies the source base station on movement that the handover is possible (Step St1705).

Here, the source base station on movement notifies the SGW of information about capability of reciprocity of the user equipment and information about a capable MCS and number of layers as information of the user equipment (Step St1706). Particularly, it is efficient that the above-mentioned information to be notified be information for each frequency band. The SGW transfers the notified information to the target base station on movement (Step ST1707). Therefore, when the source base station on movement directly transmits a status transfer to the target base station on movement, it is efficient because configuration time can be reduced. The target base station on movement determines capability of reciprocity, a capable MCS and number of layers, etc. (Step St1708), and notifies the source base station on movement of configuration information of the capability of precoding for each frequency band to be used as a result of the determination (Step St1709).

Subsequent Steps St1710 to St1715 are the same as the example of FIG. 17 (example in which configuration of capability of reciprocity for each frequency band is performed at the time of channel configuration).

According to the fourth embodiment, for example, the following configuration is provided.

A communication system including a user equipment, and a base station configured to be connected to the user equipment to perform radio communication with the user equipment is provided. More specifically, the user equipment is configured to perform reciprocity-using channel estimation being channel estimation using reciprocity of a channel, for each frequency band. The user equipment transmits reciprocity capability information indicating whether or not the reciprocity-using channel estimation can be performed for each frequency band to the base station. The base station performs communication with the user equipment by using the reciprocity-using channel estimation in a frequency band in which both of the user equipment and the base station are allowed to perform the reciprocity-using channel estimation, based on the reciprocity capability information of the user equipment.

According to such a configuration, the above-mentioned problem is solved, and the above-mentioned effect can be obtained.

Each of the embodiments and modifications of the embodiments described above are merely an example of the present invention, and each of the embodiments and modifications of the embodiments described above can be freely combined within the scope of the present invention. Further, any component of each of the embodiments and modifications of the embodiments described above can be changed or omitted as appropriate.

While the invention has been shown and described in detail, the foregoing description is in all aspects illustrative and not restrictive. It is therefore understood that numerous unillustrated modifications can be devised without departing from the scope of the invention.

EXPLANATION OF REFERENCE SIGNS 200 communication system, 202 user equipment, 203, 800 base station

The invention claimed is:

1. A communication system comprising:
a user equipment that includes a multi-element antenna; and
a base station configured to be connected to the user equipment to perform radio communication with the user equipment, wherein
the user equipment performs radio communication with a two-stage beamforming method by using the multi-element antenna to simultaneously transmit a plurality of beams at each stage, wherein a first stage includes a first beam directed to the base station and at least one second beam directed to another base station and having directivity different from directivity of the first beam, and
the user equipment transmits information for identifying an attribute of each first-stage beam to the base station.

2. A communication system comprising:
a user equipment; and
a base station configured to be connected to the user equipment to perform radio communication with the user equipment, wherein
the user equipment performs radio communication with a two-stage beamforming method by using a multi-element antenna, and
when the user equipment communicates with a first base station while not communicating with a second base station, the user equipment forms, as first-stage beams, a first beam having a main beam directed to the first base station and a null directed to the second base station, and at least one second beam having a null directed to the second base station and having directivity different from directivity of the first beam.

3. A communication system comprising:
a user equipment; and
a base station configured to be connected to the user equipment to perform radio communication with the user equipment, wherein
the user equipment performs radio communication with a two-stage beamforming method by using a multi-element antenna, and
when the user equipment communicates with a first base station while not communicating with a second base station, the user equipment designs at least one beam having a main beam directed to a direction of a multipath of the first base station and having a null directed to the second base station by adjusting a configuration number of the multipath, and forms the designed beam as a first-stage beam.

* * * * *